United States Patent [19]

Fox et al.

[11] Patent Number: 4,554,593

[45] Date of Patent: Nov. 19, 1985

[54] UNIVERSAL THRESHOLDER/DISCRIMINATOR

[75] Inventors: Sidney J. Fox; Filip J. Yeskel, both of Boulder County, Colo.; William J. Zimmermann, Jr., Tioga, N.Y.

[73] Assignee: International Business Machines Corporation, Armonk, N.Y.

[21] Appl. No.: 409,239

[22] Filed: Aug. 18, 1982

Related U.S. Application Data

[63] Continuation-in-part of Ser. No. 222,103, Jan. 2, 1981, abandoned.

[51] Int. Cl.$^4$ ............................................... H04N 1/40
[52] U.S. Cl. .................................... 358/282; 358/284; 382/50; 382/54
[58] Field of Search ............... 358/280, 282, 283, 298, 358/284; 382/50, 52, 54, 51

[56] References Cited

U.S. PATENT DOCUMENTS

| | | | |
|---|---|---|---|
| 2,255,408 | 9/1941 | Carlisle | 358/282 |
| 3,294,896 | 12/1966 | Young, Jr. | 358/283 |
| 3,466,603 | 9/1969 | Shelton, Jr. | 340/146.3 AG |
| 3,723,649 | 3/1973 | Pitegoff et al. | 358/282 |
| 4,004,079 | 1/1977 | Boston | 358/283 |
| 4,092,668 | 5/1978 | Knop | 358/282 |
| 4,106,061 | 8/1978 | Burnett | 358/283 |
| 4,133,008 | 1/1979 | Tisue | 358/282 |
| 4,150,400 | 4/1979 | Wong | 358/260 |
| 4,194,221 | 3/1980 | Stoffel | 358/283 |
| 4,251,837 | 2/1981 | Janeway, III | 358/280 |
| 4,403,257 | 9/1983 | Hsieh | 358/280 |
| 4,447,830 | 5/1984 | Stoffel | 358/283 |

OTHER PUBLICATIONS

Stucki et al—Improving Reproduction of Images Containing Continuous Tone and Alphanumeric Text—IBM Tech. Discl. Bull. vol. 19, #9, pp. 3566-3568,-Feb. 1977.

Primary Examiner—Edward L. Coles, Sr.
Attorney, Agent, or Firm—Joscelyn G. Cockburn; Carl M. Wright

[57] ABSTRACT

Image processing system for reproducing on a bilevel medium documents having mixed formats (text, halftone, and continuous tone) by selective thresholding of scanned pel values based on detected characteristics of the material to be reproduced. The characteristics of interest for each pel include its reflectance (gray) level, a gradient value derived from surrounding pels, a hysteresis value based on the thresholding decisions for preceding pels, and a look-ahead value based on following pels. Depending on relationships among the characteristics of interest, the pel values are applied to one of a plurality of thresholders most suitable for thresholding the determined format. The determination (discrimination) process can be improved by including a novel defocused symmetry discriminator (or a high-frequency detector) in conjunction with an information homogeneity discriminator to eliminate local anomolies.

27 Claims, 32 Drawing Figures

FIG. 13B
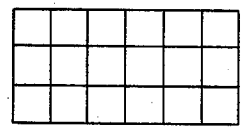
FIG. 13C
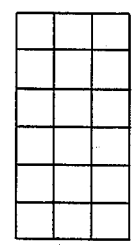
FIG. 14A
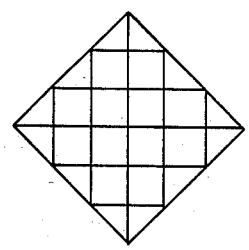
FIG. 14B
FIG. 14C
FIG. 14D
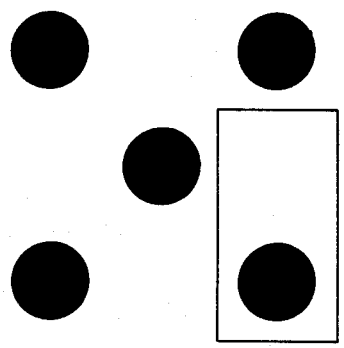
FIG. 15
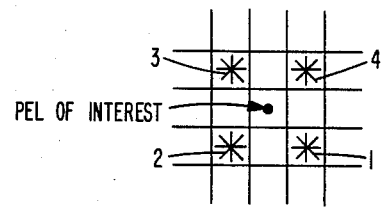

RADIUS=1

RADIUS=2

RADIUS=3

$HF(X)_{R=1}$ $HF(Y)_{R=1}$ $HF(d1)_{R=1}$ $HF(d2)_{R=1}$

4,554,593

UNIVERSAL THRESHOLDER/DISCRIMINATOR

CROSS-REFERENCE TO RELATED APPLICATIONS

This is a Continuation-in-Part application of an application (assigned to the same assignee) titled "A Thresholder for Text and Photographs," Ser. No. 222,103, filed Jan. 2, 1981, and abandoned Oct. 18, 1982.

DOCUMENTS INCORPORATED BY REFERENCE

"Multiple Error Correction Algorithm for Halftone, Continuous Tone and Text Reproduction," S. J. Fox, T. D. Friedman, R. Schaadt, P. Stucki and K. Wong, *IBM Technical Disclosure Bulletin,* Vol. 23, No. 10 (March 1981), pp. 4433-4435.

BACKGROUND OF THE INVENTION

1. Field of the Invention

This invention relates to a system for processing pixels representative of the informational contents of a document. Particularly, the invention relates to an automatic system for processing pixels representative of mixed format documents containing text (line copy) material, photographic (continuous tone) material, and halftone material.

2. Description of the Prior Art

The processing of documents for electronic copying or facsimile transmission is well known in the prior art. The processing of documents includes the steps of scanning the document and generating a video stream of pixels (picture elements). The pixels are the electronic representation of the informational contents of the document. The video stream of data is next thresholded and printed.

The prior art abounds with scanners suitable for generating video streams of pixels. Generally, the pixels are generated by reflectively scanning the document. By way of example, U.S. Pat. No. 4,146,786 is representative of the prior art. In the patent, a plurality of linear sensor arrays are used to scan a line of data on an original document.

Generally, text material and continuous tone material are thresholded with different thresholders suitably optimized to take advantage of their different characteristics. Text material is optimized by a thresholding technique which results in sharp edge definition, high contrast and high frequency detail rendition. The prior art usually uses a single fixed thresholder or variations thereof to process text materials. The fixed thresholder is usually placed at the midpoint of a gray scale range. The video representation of the textural material is measured against the fixed thresholder. An example of such a thresholding technique is in U.S. Pat. No. 3,723,649. Continuous tone material is optimized by a thresholding technique which results in good gray scale reproduction and only moderate detail rendition. Examples in the prior art are the so-called "matrix thresholding" which includes a matrix of different thresholding values repeated periodically across the document and the so-called "error diffusion." The thresholding techniques which are optimized for one type of material generally yield results which are marginal to poor on the other type of material.

Attempts have been made to switch between thresholders optimized for text or continuous tone reproduction. The switching is usually based on local information surrounding the pixel of interest. Examples in the prior art are U.S. Pat. Nos. 3,294,896 and 2,255,408. Generally, these fall into two classes: switching determined by gradient or frequency and switching determined by video level.

U.S. Pat. No. 3,294,896 is an example of the latter. In the method taught by this patent, signals developed by a photocell are passed through a two-level threshold network. Signals above the upper threshold are transmitted as black and signals below the lower threshold are transmitted as white. Signals falling between the two levels are transmitted as gray and represented by the results of thresholding by a continuous tone thresholder.

U.S. Pat. No. 2,255,408 is an example of gradient or frequency switching. High frequency changes in reflectance are assigned to text thresholders and low frequency changes in reflectance are assigned to continuous tone thresholders.

Both of the above methods are inadequate for high quality reproduction of mixed format documents. The former fails in the transition regions on the edge of text and the latter in the flat middle sections of text characters. Attempts to avoid this degradation in text reproduction by narrowing the range between upper and lower thresholds result in severe truncation of the gray scale range of the continuous tone reproduction.

U.S. Pat. No. 3,622,698 describes a facsimile system which can be manually controlled depending on whether the document being scanned is text or photograph. A switch is provided for an operator to adjust based on the format of the document. The control is achieved by changing the threshold and saturation level of the transmitted signal.

SUMMARY OF THE INVENTION

It is therefore the object of the present invention to provide a mode-switching device which processes documents of a mixed format in a more efficient manner than was heretofore possible without manual intervention and without requiring full page preprocessing.

It is another object of the present invention to provide an improved mode-switching device.

It is yet another object of the present invention to provide an automatic mode-switching apparatus which processes video data in accordance with a series of processing steps and selects an optimum thresholding device for thresholding text or continuous tone or halftone material so as to ensure the fullest range of gray scale reproduction capability for the latter without sacrificing contrast and edge definition of the text material.

The mode-switching device of the present invention utilizes gradient, level, and hysteresis information to determine the optimum thresholding device for processing a particular type of data.

The mode-switching device includes an input buffer storage, preferably configured as a serial memory and storing, for example, five lines of storage. For each pixel of interest, a gradient logic means determines the gradient of surrounding pixels. The gradient logic means generates a gradient signal representative of the gradient for the pixel of interest.

A look-ahead logic means generates a look-ahead signal representative of the reflectance characteristics of pixels downstream from the pixel of interest. The look-ahead signal gives an indication of the type of data following the pixel of interest. A plurality of latches store a plurality of machine state signals. The machine state signals correspond with a desired reflectance range of a document to be printed. The machine state signals can be changed periodically. A controller, including an algorithm, correlates the level signals, the gradient signals, the machine state signals and the look-ahead signals to output a print/no-print decision signal.

In one feature of the invention, the print/no-print decision is generated by a continuous tone thresholder.

So far, the above-described apparatus and method (algorithm) are adapted to process line copy and continuous tone documents. A third type of information which is present in a mixed format document is the halftone information. A halftone detector is coupled to the above-described apparatus and the combination forms a general purpose document processing device (GPD) which processes mixed format documents containing line copy information, continuous tone information, and halftone information.

In one embodiment of the invention, the GPD includes a high frequency detector. The high frequency detector operates on picture elements (PELs) that are neither "black" nor "white." Black and white PELs are thresholded against a fixed threshold. If high frequency data is found in the non-black and non-white PELs, these PELs are further classified as either high frequency line copy, e.g., small text, or high frequency non-line copy, e.g. halftone. Hysteresis counters which are associated with line copy (LC) data and the halftone (HT) data are reset to zero or set to maximum value. The line copy data is thresholded against a fixed threshold and the halftone data is thresholded against an error diffusion threshold.

In another embodiment of the present invention, the GPD includes a defocus symmetry discriminator. The defocus symmetry discriminator operates on each original PEL video data to determine the characteristic of the scanned data. If the defocus symmetry discriminator decides that the PEL represents line copy, the original PEL is sent to the line copy/continuous tone discriminator. If the defocus symmetry discriminator decides that the PEL represents nonline copy data (nonline copy may be continuous tone or halftone), a "defocused" version of the original PEL is transmitted to the line copy/continuous tone discriminator which characterizes the original line copy PEL or the defocus PEL as line copy or nonline copy. An information homogeneity discriminator next examines the PEL in light of its surroundings. If the original characterization of the PEL matches that of its surroundings, then the original characterization stands. However, if the original characterization of the PEL differs from that of its surroundings, the original characterization is overruled and the PEL is characterized in accordance with its surroundings. The original PEL is thresholded by a fixed thresholder if the PEL is characterized as line copy. The original PEL is thresholded by an error diffusion thresholder if the PEL is nonline copy.

The foregoing and other features and advantages of the invention will be apparent from the following more particular description of the preferred embodiment of the invention as illustrated in the accompanying figures.

BRIEF DESCRIPTION OF THE DRAWING

FIG. 13 is a flowchart of the technique used to discriminate between line copy and nonline copy PELs using the "defocused symmetry" technique and to send either the original (focused) or the defocused PELs, respectively, on to the next stage.

FIGS. 13A and 13B are two PEL maps for illustrating the technique used to determine the weighted average of the defocus PELs.

FIGS. 14A–14C are different types of cell shapes used to determine the weighted averages.

FIG. 14D is an illustration of a vertical cell superimposed on a halftone.

FIG. 15 is a graphical representation illustrating a technique used to determine gradient.

DETAILED DESCRIPTION OF THE PREFERRED EMBODIMENTS

Line Copy/Continuous Tone Device

Figure 1:
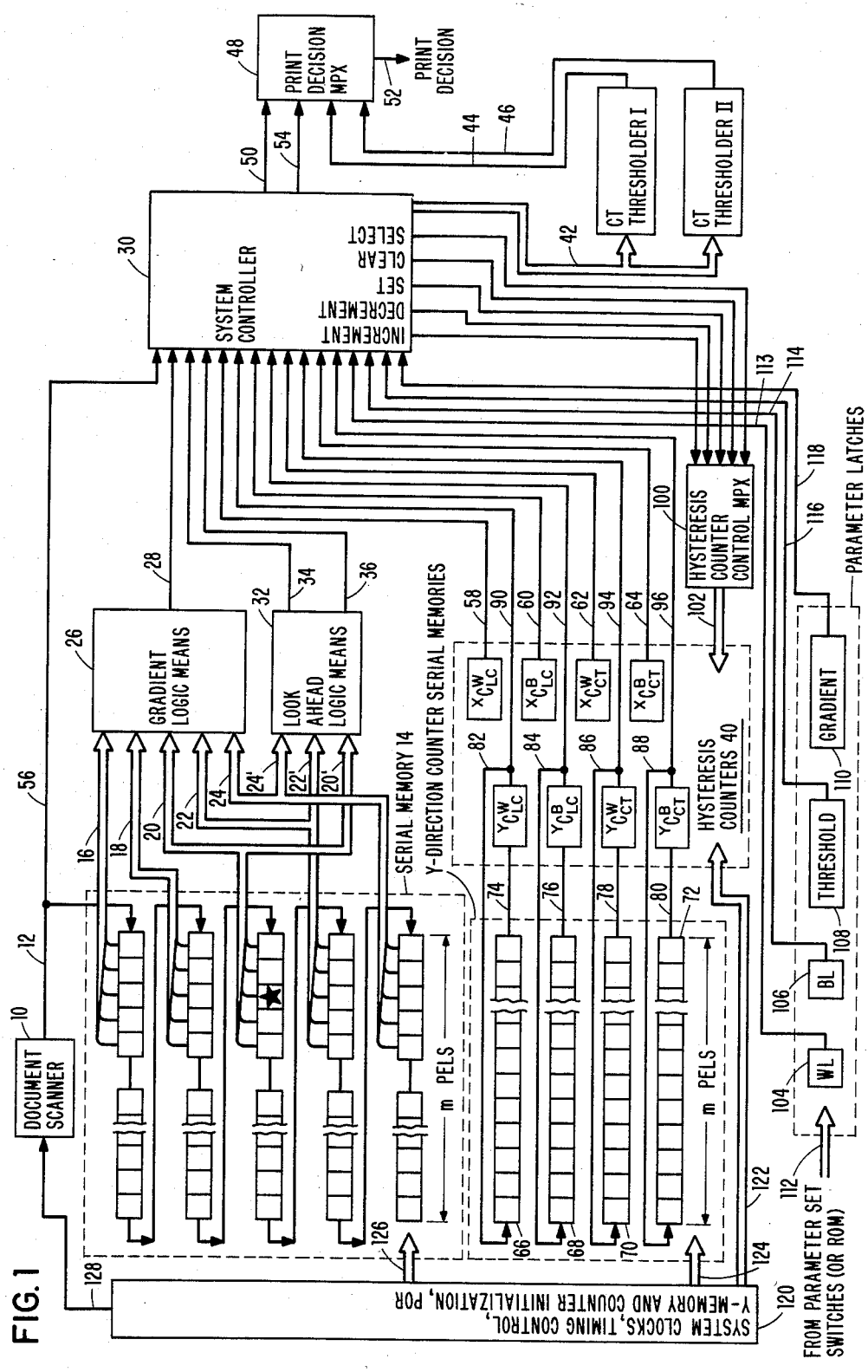
FIG. 1 is a block diagram showing one embodiment of a mode-switching device according to present invention processing documents containing line copy, continuous tone, or both.

FIG. 1 shows, in block diagram form, a mode-switching device according to the teaching of the present invention. The device scans a mixed format document, selects an optimum thresholder for processing the data, and generates print/no-print decisions for driving a bilevel reproducing device such as an ink jet printer. The mode-switching device includes a conventional document scanner 10. The document scanner is fitted with a transparent document platen upon which the document to be reproduced is placed. The scanner further includes illumination means, optical means and a plurality of photosensitive elements. Each is coupled in a conventional or well-known manner and will not be described in detail. Suffice it to say, each photosensitive element supplies a video signal representative of an elementary piece of information recorded on the document. The output from the photosensitive element is referred to in the art as a picture element (PEL) or pixel. The PELs representing the scan data are fed over conductor 12 into storage means 14. The conductor 12 includes a plurality of simplex bit lines with each bit line carrying one bit of information. The bit lines are configured so that N bit lines are needed to carry information for a single PEL (N bits/PEL). Although the storage means 14 may include a plurality of different types of prior art storage, in the preferred embodiment of this invention, the storage means is configured as a serial memory with five lines of storage. Each line stores M PELs. With this configuration, data supplied on conductor 12 is rippled through the various stages of the first line storage into the second line storage, then into the third line storage, and so on. (Other types of configurations can be used without departing from the teaching and scope of the present invention.) The gray scale value of data is coupled by conductor 56 to the system controller 30.

Figure 5:
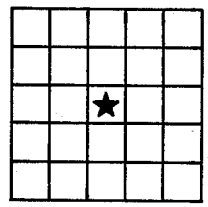
FIG. 5 is a representation of the map of PELs used by the gradient logic to calculate gradient.

The first five shift register stages associated with each of the line storages are fed over multiplexor buses 16, 18, 20, 22 and 24, respectively, into gradient logic means 26. As will be explained in more detail, the function of the gradient logic means is to sense adjoining PELs and to determine the gradient associated with a particular PEL of interest. In FIG. 5 there is a chart for illustrating a preferred method for calculating the gradient associated with a particular PEL, hereinafter call the PEL of interest. (Other methods for determining a gradient, i.e., a measure of the rate of change of the information, may also be used.) Suppose that the PEL of interest is the PEL identified by the star in FIG. 5 corresponding to the star in storage means 14 (FIG. 1). Since each PEL is rippled through the shift register of serial memory stages at some point in time, every PEL outputted from the scanner will be a PEL of interest. As such, every PEL outputted from the scanner is processed according to the teaching of the present invention. Each box in FIG. 5 represents a PEL in the five line serial memory storage means. Each box contains a number, e.g., in the range 0–15, representing a gray scale value assigned to a PEL. Other gray scale range may be used without departing from the scope of the invention. For discussion purposes, the box containing the star is the PEL of interest whose gradient is to be identified. The gradient is determined in accordance with the following equation:

$$GRAD = MAX - MIN$$

where
GRAD represents the gradient of the PEL of interest;
MAX represents the maximum gray scale value in the area of interest; and
MIN represents the minimum gray scale value in the area of interest. (The area of interest is defined as the region around the PEL of interest over which the gradient is determined; in this description, it is the 24 surrounding PELs.)

By way of example, if the maximum gray scale value in the boxes of FIG. 5 was 15 and the minimum value were 3, then the gradient for the PEL of interest would be $15 - 3 = 12$. Although a $5 \times 5$ matrix is used to calculate the gradient associated with the PEL of interest, this should be construed as illustrative and does not limit the scope of the present invention. Once the gradient for each PEL is determined, its value is coupled via conductor 28 (FIG. 1) to the system controller 30. N bit lines per PEL are used to transmit the gradient information over conductor 28 into the system controller.

Figure 6:
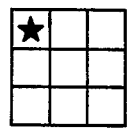
FIG. 6 is a PEL map used by the look-ahead logic to calculate look-ahead information.

A look-ahead logic means 32 is coupled by multiplexor buses 24', 22' and 20' to the storage means 14. In the preferred embodiments of this invention, a $3 \times 3$ matrix is used to calculate the look-ahead information. As with the gradient logic means, other type of logic means may be used to generate the look-ahead information. The function of the look-ahead logic is to sense PELs following the PEL of interest and to generate a signal representative of the type of data. FIG. 6 is a graphical representation of the PELs used to calculate the look-ahead information. For description purposes, the starred box is taken to be the PEL of interest. There are two types of look-ahead information: look-ahead black (LAB) and look-ahead white (LAW). LAB is true if any PEL in the $3 \times 3$ look-ahead matrix is greater than or equal to the white level threshold value (WL). LAW is true if any PEL in the look-ahead area is less than or equal to the black level threshold value (BL).

In FIG. 1, the look-ahead white (LAW) information is a one-bit signal supplied over conductor 34. Similarly, the look-ahead black (LAB) information is a one-bit signal supplied over conductor 36. The data on conductors 34 and 36 are fed into system controller 30.

The function of system controller 30 is to correlate the signals from the gradient logic means, the look-ahead logic means, and the hysteresis counter 40 to select an optimum thresholder for processing the data outputted from the document scanner 10. The correlation of signals is performed in accordance with a predetermined series of process steps or algorithm. The algorithm or series of process steps will be described shortly. That information needed by the continuous tone thresholders, such as PEL gradient, gray value, etc., is passed over bus 42 to continuous tone thresholder 1 (CT Thresholder I) and continuous tone thresholder 2 (CT Thresholder II). These continuous tone thresholders are, in one embodiment, conventional thresholders of the matrix type, well known in the prior art, and therefore their detail will not be described here. The selection algorithm defaults to the continuous tone thresholder II, which is line copy (LC) biased, when it cannot determine which thresholder to select. (Any other continuous tone thresholding technique known in the art can be used in place of matrix thresholding.)

Two one-bit lines 44 and 46 couple the thresholders to the print decision multiplexor (MPX) 48. The function of the print decision multiplexor block 48 is to determine, under the control of a two-bit select line 50, which of its input lines 44, 46, or 54 should be coupled to its one-bit print decision output line 52, 46 or 54. The signal on conductor 54 is supplied when the system controller 30 determines that a line copy thresholder (also called Text Type Thresholder) is to process the data.

Figure 4:
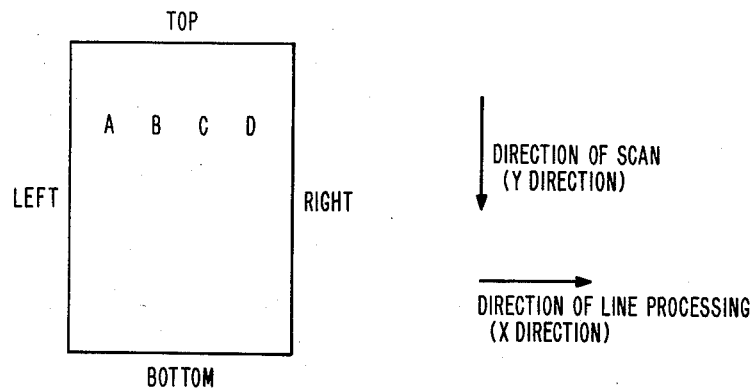
FIG. 4 is an illustration of a document and the directions of scan and processing.

The other set of signals which is used by the system controller 30 is from the hysteresis counters 40. There are two sets of counters in the preferred embodiment, the X set of counters and the Y set of counters. The X set of counters stores hysteresis information relative to the X direction of processing. The Y set of counters stores information relative to the Y direction of processing (FIG. 4). The present invention is capable of handling mixed mode documents containing line copy (textual material) and/or continuous tone material (photographs). The reflectance characteristics of line copy may be either black, representing the informational contents of the page, or white, representing background information. Similarly, the continuous tone (CT) material may be white, representing background, or black (gray), representing the informational contents of the page. Two counters store hysteresis information relative to line copy black and line copy white. There are two counters for storing continuous tone information white and continuous tone information black. The output from each of the four X counters is coupled by conductors 58, 60, 62, and 64 to system controller 30. The signals on conductors 58, 60, and 62 represent four-bit hysteresis counts. The signal on conductor 64 is a one-bit hysteresis flag. The hysteresis counts and flags record the past history of the information being processed.

The Y counters keep track of hysteresis associated with scanned data in the Y direction. Two of the counters are used for keeping hysteresis information of line copy (LC) in the Y direction. Similarly, two of the hysteresis counters are used for keeping hysteresis information relative to continuous tone (CT) data in the Y direction. For the Y direction counters, there needs to be as many counters as there are PELs in a line. To minimize the number of counters, a plurality of Y direction counter serial memories identified as 66, 68, 70 and 72 are coupled over conductors 74, 76, 78 and 80 into the Y counters. In the preferred embodiment of the invention, each serial memory is M PELs wide, with M equal to the number of PELs in a line. Also, conductors 74, 76 and 78 are four-bits wide, and conductor 80 is one-bit wide. The output from each Y directional counter is fed back over conductors 82, 84, 86 and 88 into the input of the associated serial memory and over conductors 90, 92, 94 and 96 into the system controller 30. The system controller 30 generates a plurality of control signals identified as increment, decrement, set, and clear, coupling the signals over the associated one-bit line into the hysteresis counter control multiplexor (MPX) block 100. Similarly, a three-bit select signal is fed over the select line into the multiplexor 100. Under the control of the select line, the hysteresis counter control multiplexor 100 supplies control signals over multiplexor bus 102 to the hysteresis counter means 40. The signal selects the appropriate counter in accordance with the algorithm to be described hereinafter and either increments, decrements, sets or clears the contents of the counter.

Another set of signals which is fed into the system controller 30 is the parameter latches signals or machine state signals. The signals are generated by latches 104, 106, 108 and 110. The signals are fed over conductors 113, 114, 116 and 118 into the system controller. Each of the conductors is N bits wide. The data, which is loaded in the latches, is based upon a desired reflectance characteristic of the document to be scanned. As such, the information loaded in latch 104 is the white level (WL) information. The information loaded in latch 106 is the black level (BL) information. The information loaded into latch 108 is threshold level information. The information loaded into latch 110 is gradient level information. Loading of the latches is achieved over multiplexor bus 112 from a plurality of switches (not shown) with each switch representing one of the previously described parameters or from a read-only memory (ROM) under programming control. The function of the machine state latches is to store predetermined data for improving the quality of reproduced copies. By way of example, the machine state latch settings are somewhat analogous to the contrast control setting associated with a conventional convenience copier.

An enabling device 120 generates enabling signals for driving the mode-switching device. By way of example, the device generates the system clocks, timing control, Y-memory and counter initializing signal, power-on reset (POR) signal, etc. The signals are fed over multiplexor buses 122, 124, 126 and 128 for driving the system.

Figure 11:
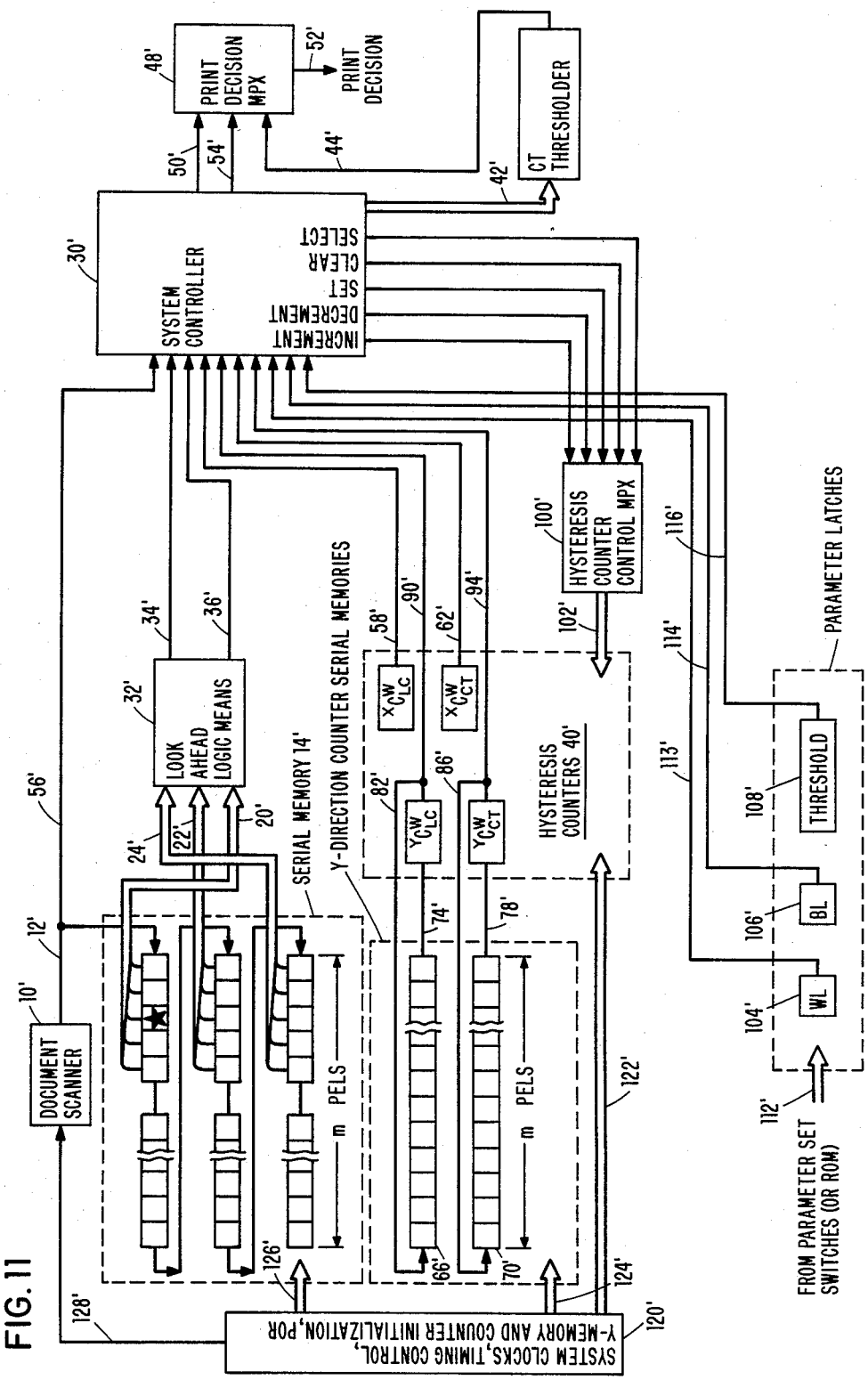
FIG. 11 is a block diagram of another simplified embodiment of a mode-switching device according to the teaching of the present invention.

FIG. 11 shows, in block diagram form, another mode-switching device according to the teaching of the present invention. The device scans a mixed format document, selects an optimum thresholder for processing the data, and generates print/no-print decisions for driving a bilevel reproducing device such as an ink jet printer. The mode-switching device includes a conventional document scanner 10'. The document scanner is fitted with a transparent document platen upon which the document to be reproduced is placed. The scanner further includes illumination means, optical means, and a plurality of photosensitive elements. Each is coupled in a conventional or well-known manner and will not be described in detail. Each photosensitive element supplies a video signal representative of an elementary piece of information recorded on the document. The output from the photosensitive element is referred to in the art as a picture element (PEL) or pixel. The PELs representing the scan data are fed over conductor 12' into storage means 14'. The conductor 12' includes a plurality of simplex bit lines with each bit line carrying one bit of information. The bit lines are configured so that N bit lines are needed to carry information for a single PEL (N bits/PEL). Although the storage means 14' may include a plurality of different types of prior art storage, in the preferred embodiment of this invention, the storage means is configured as a serial memory with three lines of storage. Each line stores M PELs. With this configuration, data which is outputted on conductor 12' is rippled through the various stages of the first line storage into the second line storage then into the third line storage. (Other types of configurations can be used without departing from the teaching and scope of the present invention.)

Since each PEL is rippled through the shift register or serial memory stages at some point in time, every PEL outputted from the scanner will be a PEL of interest (identified by a "star" in FIG. 11). As such, every PEL outputted from the scanner is processed according to the teaching of the present invention.

A look-ahead logic means 32' is coupled over multiplexor buses 24', 22' and 20' to the storage means 14'. In the preferred embodiments of this invention, a 3×3 matrix is used to calculate the look-ahead information. Any other type of logic means may be used to generate the look-ahead information. The function of the look-ahead logic is to sense PELs following the PEL of interest and to generate a signal representative of the type of data. FIG. 6 shows a graphical representation of a PEL map used to calculate the look-ahead information. For description purposes, assuming that the starred box is the PEL of interest, there are two types of look-ahead information: look-ahead black (LAB) and look-ahead white (LAW). LAB is true if any PEL in the 3×3 look-ahead matrix is greater than or equal to the white level threshold value (WL). LAW is true if any PEL in the look-ahead area is less than or equal to the black level threshold value (BL).

In FIG. 11, the look-ahead white (LAW) information is a one-bit signal outputted on conductor 34′. Similarly, the look-ahead black (LAB) information is a one-bit signal outputted on conductor 36′. The data on conductors 34′ and 36′ are fed into system controller 30′.

The function of system controller 30′ is to correlate the signals outputted from the gradient logic means, the look-ahead logic means, and the hysteresis counter 40′ to select an optimum thresholder for processing the data outputted from the document scanner 10′. The correlation of signals is performed in accordance with a predetermined series of process steps or algorithm. The algorithm or series of process steps will be described shortly. It should be noted that information needed by the continuous tone thresholder, such as PEL gradient, gray value, etc., is passed over bus 42′ to the continuous tone thresholder (CT Thresholder). The continuous tone thresholder, in one embodiment, is a conventional thresholder of the matrix type, well known in the prior art, and therefore its details will not be described here.

A one-bit line 44′, is outputted from the thresholder into print decision multiplexer (MPX) block 48′. The function of the print decision multiplexor block 48′ is to determine, under the control of a one-bit select line 50′, whether the data which is used as the one-bit print decision line 52′ should be taken from conductor 44′ or 54′. The signal on conductor 54′ is valid when the system controller 30′ determines that a line copy thresholder (also called Text Type Thresholder) is to process the data. The gray scale value of data is also fed over conductor 54′ into the system controller 30′.

The other set of signals used by the system controller 30′ is from the hysteresis counters 40′. There are two sets of counters in the preferred embodiment, the X set of counters and the Y set of counters. The X set of counters stores hysteresis information relative to the X direction of processing. The Y set of counters stores information relative to the Y direction of processing. The present invention is capable of handling mixed mode documents containing line copy (textual material) or continuous tone material (photographs), or both. The output from each of the two X counters is fed over conductors 58′ and 62′ into system controller 30′. The signal on conductors 58′ and 62′ is a four-bit hysteresis count. The hysteresis counts reflect the past history of the information being processed.

There are also two Y counters. The Y counters keep track of hysteresis associated with scanned data in the Y direction. One of the counters is used for keeping hysteresis information of line copy (LC) in the Y direction. Similarly, one of the hysteresis counters is used for keeping hysteresis information relative to continuous tone (CT) data in the Y direction. For the Y direction counters, there needs to be as many counters as there are PELs in a line. To minimize the number of counters, a plurality of Y direction counter serial memories identified as 66′ and 70′ are coupled over conductors 74′ and 78′ into the Y counters. In the preferred embodiment of the invention, each serial memory is M PELs wide, with M equal to the number of PELs in a line. Also, conductors 74′ and 78′ are four bits wide. The output from each Y directional counter is fed back over conductor 82′ and 86′ into the input of the associated serial memory and over conductor 90′ and 94′ into the system controller 30′. The system controller 30′ generates a plurality of control signals identified as increment, decrement, set, and clear, feeding the signals over the associated one-bit line into the hysteresis counter control multiplexor (MPX) block 100′. Similarly, a two-bit select signal is fed over the select line into the multiplexor box 100′. Under the control of the select line, the hysteresis counter control multiplexor block 100′ outputs control signals over multiplexor bus 102′ into the hysteresis counter means 40′. The signal selects the appropriate counter in accordance with the algorithm to be described hereinafter and either increments, decrements, sets, or clears the contents of the counter.

Another set of signals fed into the system controller 30′ is the parameter latches signals or machine state signals. The signals are generated by latches 104′, 106′ and 108′. The signals are fed over conductors 113, 114 and 116 into the system controller. Each of the conductors is N bits wide. The data which is loaded in the latches is based upon a desired reflectance characteristic of the document to be scanned. The information loaded in latch 104′ is the so-called white level (WL) information. The information loaded in latch 106′ is the black level (BL) information. The information loaded into latch 108′ is threshold level information. Loading of the latches is achieved over multiplexor bus 112′ from a plurality of switches (not shown) with each switch representing one of the previously described parameters or from a read-only memory (ROM) under programming control. The function of the machine state latches is to store predetermined data for improving the quality of reproduced copies. By way of example, the machine state latch settings are somewhat analogous to the contrast control setting associated with a conventional convenience copier.

An enabling device 120′ generates enabling signals for driving the mode-switching device. By way of example, the device generates the system clocks, timing control, Y-memory and counter initializing signal, power-on reset (POR) signal, etc. The signals are fed over multiplexor buses 122′, 124′, 126′ and 128′ for driving the system.

Before describing the flowchart used by system controller 30′ to correlate the previously described input signal, a table explaining the various symbols used in FIGS. 1 and 11 and in the flowcharts will be given.

TABLE 1

| LEGEND | INTERPRETATION |
| --- | --- |
| G | PEL gray or "video" value |
| WL | White level threshold value |
| BL | Black level threshold value |
| PD | Print decision (1=print; 0=no-print) |
| C | Counter |
| $x_{CLCw}$ | x,white,line copy counter, etc. |
| w | white |
| b | black |
| LC | Line copy |
| CT | Continuous tone |
| x | X direction |
| y | Y direction |

As noted in the above table, G means the gray scale value of the PEL or video value. Similarly, WL means white level threshold value. Also, BL means black level threshold value. Likewise, $^xC_LC^w$ means line copy white hysteresis counter. Stated another way, this means the counter is used for storing white line copy hysteresis information in the X direction.

Before describing the process steps used in system controller 30' (FIG. 11) and system controller 30 (FIG. 1), the basic principles upon which these process steps are built will be described.

As will be seen from the description to follow, the present invention uses both gradient and level information, combined with prior information as to the observed nature of text and continuous tone material to select an optimum thresholder for processing documents having mixed formats. It does so preferably on a local basis without requiring preprocessing of an entire document. To this end, a set of conditions is set for determining, on a local basis, whether the input material from the document is text or continuous tone. Text is characterized by high frequency edge transitions and complete transition from white to black and vice versa in both the X and Y directions. Continuous tone material is characterized by a very high percentage of low frequency transitions, relative to high frequency transitions, and a large area compared to commonly printed sizes of text.

Figure 2:
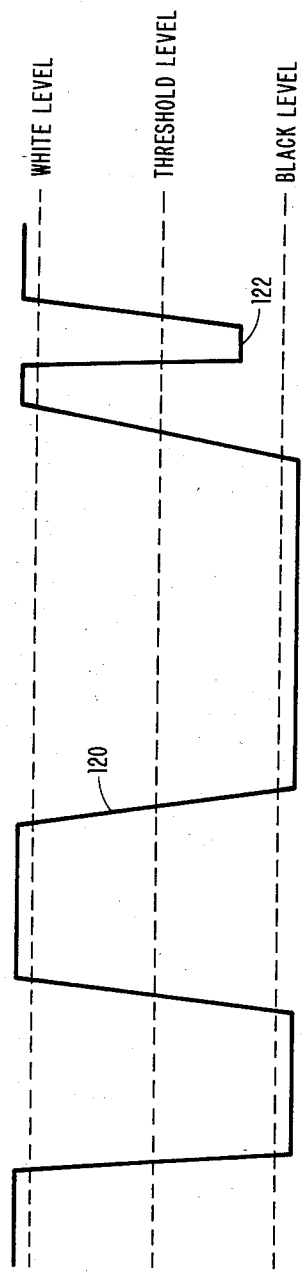
FIG. 2 is a graphical representation of a scan line of a portion of a word from a line copy document.
Figure 3:
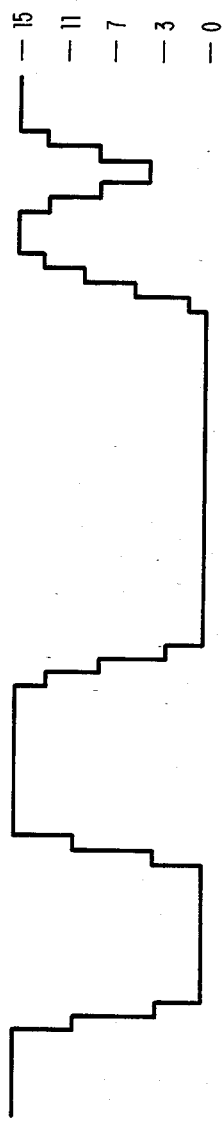
FIG. 3 is a graphical representation of the video values of the scan line of FIG. 2.

FIGS. 2 and 3 are graphic representations of the electrical signals representative of line copy. The graphs are helpful in understanding the conditions or characteristics which are used by the invention to detect line copy and to protect the gray scale dynamic range on the black end. FIG. 2 shows a scanned line of a portion of a word while FIG. 3 shows the video values for the scan of the same word. As is shown in FIG. 3, the dynamic gray scale range is between 0 and 15. (Any other gray scale range can be used without departing from the scope of the present invention.) As was stated previously, in order to reproduce a document, the video values are thresholded to determine the range within which they fall and then to make a print or no-print decision which is used to drive a bilevel printer such as an ink jet printer. The various levels which are associated with video data are shown in FIG. 2. The levels defined in FIG. 2 relative to the signal graph 120 are the black level, the threshold level and the white level. As shown in the figure, the threshold level is approximately midway between the white and the black level.

FIG. 4 illustrates a page of a document which is to be scanned by being placed on the document glass. The figure is helpful in understanding the order in which a document is scanned and processed by the system according to the present invention. As is shown in the drawing, the document has a top, bottom, left and right side. The information content of the document is relatively large size line copy. The direction of scan is from left to right by line from top to bottom. Although the illustration in FIG. 4 is directed to line copy only, the system will handle documents including continuous tone such as photographs. By empirical means, it has been determined that the following characteristics are applicable to line copy (text) information.

(1) For large text, a transition of electrical signals from a predetermined white level to a predetermined black level or vice versa in N PELs is indicative of text. N usually varies from 0 to 10 PELs. If the document data is processed from left to right as is shown in FIG. 4, and top to bottom, such a transition should be recorded preferably from both X and Y directions to be called text. The transition region and a border of PELs above the white level (white is high) and below the black level (black is low) are considered text if these conditions are met.

(2) Large solid areas in text—if the video value of the PEL is below the black level and the conditions in (1) have been previously met, i.e., to the areas to the left and above, a flag is set and the input is considered line copy until the next transition region in which this decision can be overridden.

(3) Background—if the video value is above the white level for P PELs, regardless of previous history, the line copy condition is reset. This condition can be modified to further protect white dynamic range.

(4) Small or light text—sometimes small text and typewritten text will not make the full transition from black level to white level, depending on the modulation transfer function of the scanner or the quality of the original, or both. By way of example, the point identified by 122 in FIG. 2 is where full transition is not achieved. If the transition from WL to BL is closely followed spatially by a transition from BL to WL, this can be designated as text without causing serious overshoot in detailed areas of the continuous tone. In fact, the sharpness of the text may be improved. By analyzing the video signal generated by the scanner in accordance with the above set of conditions, the document reproduced, according to the teaching of the present invention, is more significantly improved in quality than was heretofore possible.

Figures 7, 8:
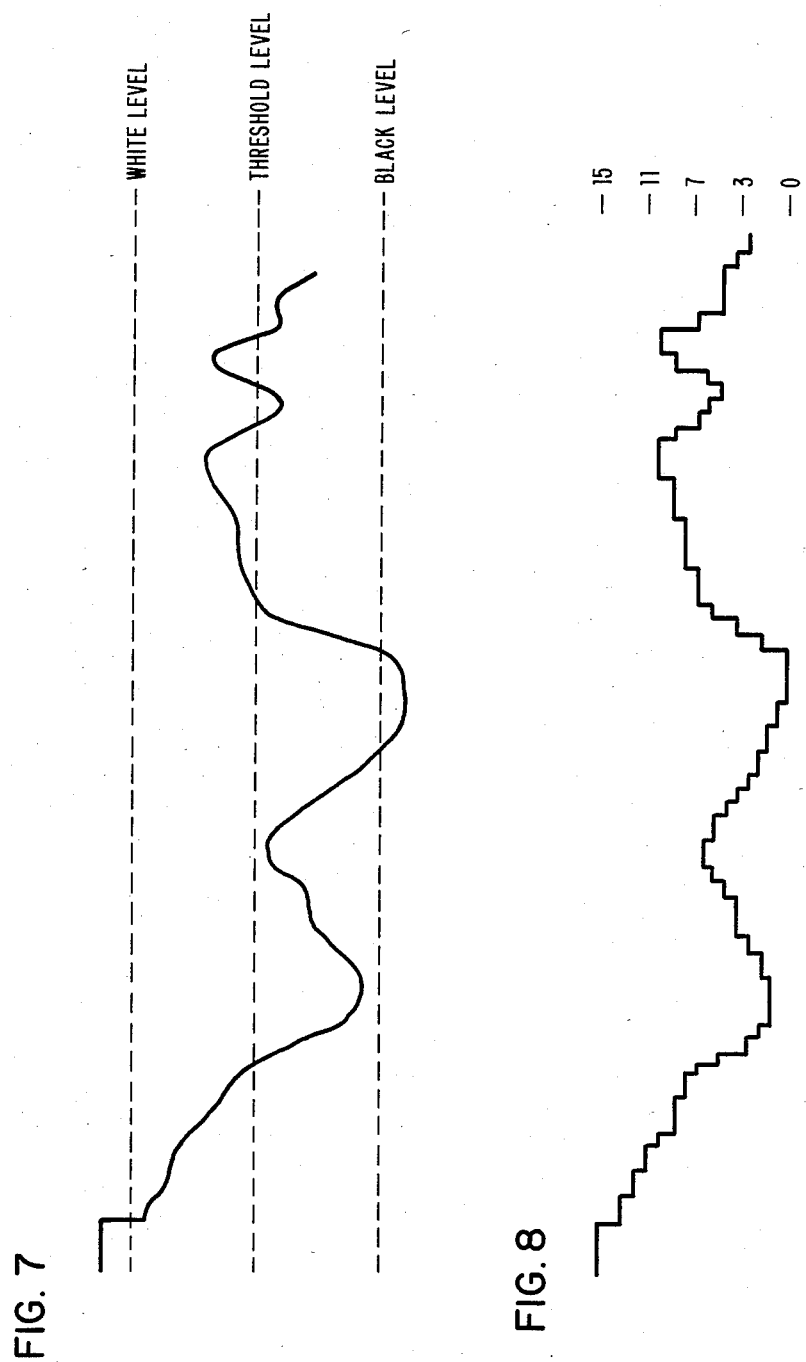
FIG. 7 is a graphical representation of a scan line for a continuous tone document.
FIG. 8 is a graph of the digitized video values of the scan line of FIG. 7.

FIGS. 7 and 8 show a graphical representations for continuous tone documents. FIG. 7 shows a representation for a scan line of a continuous tone document while FIG. 8 shows the digitized video values. As with line copies, the continuous tone document is thresholded against a gray scale dynamic range of 0 through 15 (FIG. 8). Also, the levels of interest are the black level, the threshold level and the white level. The area between the white and black level is the area of indecision. For continuous tone documents, any indecision region which does not meet one of the combinations of 1-4 above is considered continuous tone. For example, if the video values remain in the midregion between the black level and the white level for more than N PELs, the continuous tone condition is met. PELs below the black level for which (1) has not been met are continuous tone. PELs above the white level and within P PELs in either (or both) X and Y directions of midrange continuous tone (CT) decision will be considered continuous tone. The above conditions will provide maximum protection to text. The conditions will allow full dynamic range on the black and in continuous tone reproductions for a significant percentage of documents and some minimum protection of the white end. Indications of continuous tone from the right and bottom of the document will not affect decision to the left and top. The balance between line copy and continuous tone protection can be shifted more towards the latter by changing the priorities and overriding the line copy more easily.

Figure 9:
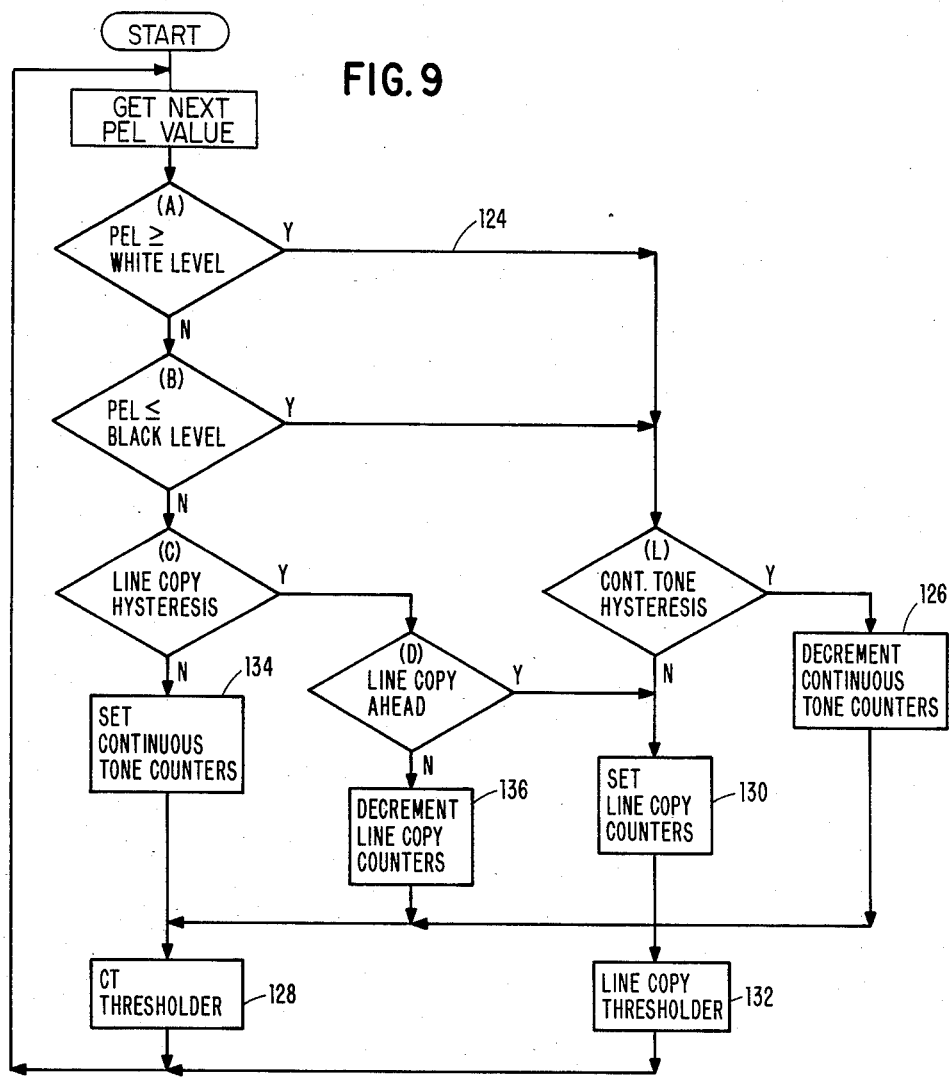
FIG. 9 is a flowchart of the process by which the pixels are generated from a document in the embodiment of FIG. 11.

FIGS. 9 and 10 are flowcharts showing process steps which must be followed for the system according to the present invention to process mixed documents. The flowchart in FIG. 9 is a simplified embodiment, that of FIG. 10 is a more complex, detailed embodiment. As was stated previously, these flowcharts would be implemented in system controllers 30' and 30. As such, a conventional microprocessor a programmable logic array, or discrete logic could be implemented in the system controller to perform the functions shown in the flowcharts 9 and 10. In FIG. 9, the first block is a connector block through which the PEL of interest enters into decisional block (A). In block (A), the PEL is tested to determine whether it is greater than or equal to the white level (see FIGS. 7 and 8). If the PEL is white, the logic exits the decisional block along path 124 into decisional block (L). In decisional block (L), the system tests to determine whether there is continuous (CONT) tone hysteresis. The continuous tone hysteresis means a history of continuous tone in either the X or Y directions within some given number of PELs. In the preferred embodiment of this invention, the number of PELs is 10. It should be noted that the hysteresis information would be obtained from the contents of the hysteresis counters (FIG. 11). If there were a history of continuous tone in either X or Y directions, the program enters function block 126 and decrements the X and Y continuous tone counters. The program then exits from functional block 126 to functional block 128, the continuous tone thresholder. One embodiment of block 128 is a matrix thresholder. Other embodiments may be used. From decisional block 128, the program loops to fetch another PEL.

If the decision from decisional block (A) was no instead of yes, then the program enters decisional block (B). In decisional block (B), the PEL is tested to determine whether it is less than or equal to the black level. If the result is yes, the program enters continuous tone hysteresis decisional block (L). If there is continuous tone hysteresis in either X or Y directions, then the program traverses the path already described through functional blocks 126 and 128 to fetch another PEL. Assuming that there was no continuous tone hysteresis in both X and Y directions, then the program exits decisional block (L) into functional block 130. In block 130, the program sets the X and Y line copy counters and exits the block into functional block 132. In block 132, the PEL is thresholded against a line copy thresholder. Usually, the line copy thresholder is a simple level thresholder. With reference to FIGS. 7 and 8, the threshold level would be selected to be probably eight, midway between the white and the black. Pels falling below the threshold level eight would probably be thresholded as black, that is, a print, and those above threshold level be reproduced as no-print white.

From functional block 132, the program exits to fetch another PEL. If the decision from decisional block B was no (that is, the PEL is not black and probably gray), the program then enters decisional block (C). In block (C) the program determines whether there is line copy hysteresis. If there is no line copy hysteresis in either X or Y directions, the program exits the block into functional block 134. In block 134, the program sets both X and Y continuous tone counters. It should be noted that the decrement function which occurs in block 126 would be to decrement the counters which are set by block 134. From block 134, the program then enters block 128 performing the function previously described.

If the decision from decisional block (C) was yes, then the program would enter decisional block (D). In decisional block (D), the program determines whether there is line copy ahead, that is, if either LAB or LAW is true. If there is line copy ahead, then the program exits decisional block (D) to functional blocks 130, 132, etc. The path including these blocks has already been described and will not be repeated. If the decision from decisional block (D) is no, then the program exits the block into functional block 136. In block 136, the line copy counters which were previously set by block 130 are decremented and the program exits the block through decisional block 128, etc.

In summary, the algorithm is structured so that it fetches the gray scale value for a PEL of interest. The PEL is tested to determine whether it is white or black. If it is neither white nor black, and there is no line copy hysteresis, then the program sets one or more continuous tone counters and the PEL is processed using a thresholder for processing continuous tone.

If the PEL is neither white nor black, and there is line copy hysteresis, the program looks ahead to see if the following data is line copy.

If the look-ahead data is not line copy, the line copy counter is decremented and the continuous tone thresholder is used for reproducing the data.

If the look-ahead data is line copy, the line copy counter is set and a line copy thresholder is used.

If the PEL that was fetched is above the white level and there is continuous tone hysteresis, the continuous tone counter is decremented and the continuous tone thresholder is used to process the data.

If there is no continuous tone hysteresis, the line copy counter is set and the line copy thresholder is used to threshold the data.

If the PEL is below the black level and there is no continuous tone hysteresis, the line copy counter is set and the line copy thresholder is used to threshold the data.

If the PEL is below the black level and there is continuous tone hysteresis, the continuous tone counter is decremented and the continuous tone thresholder is used to threshold the data.

Figure 10A:
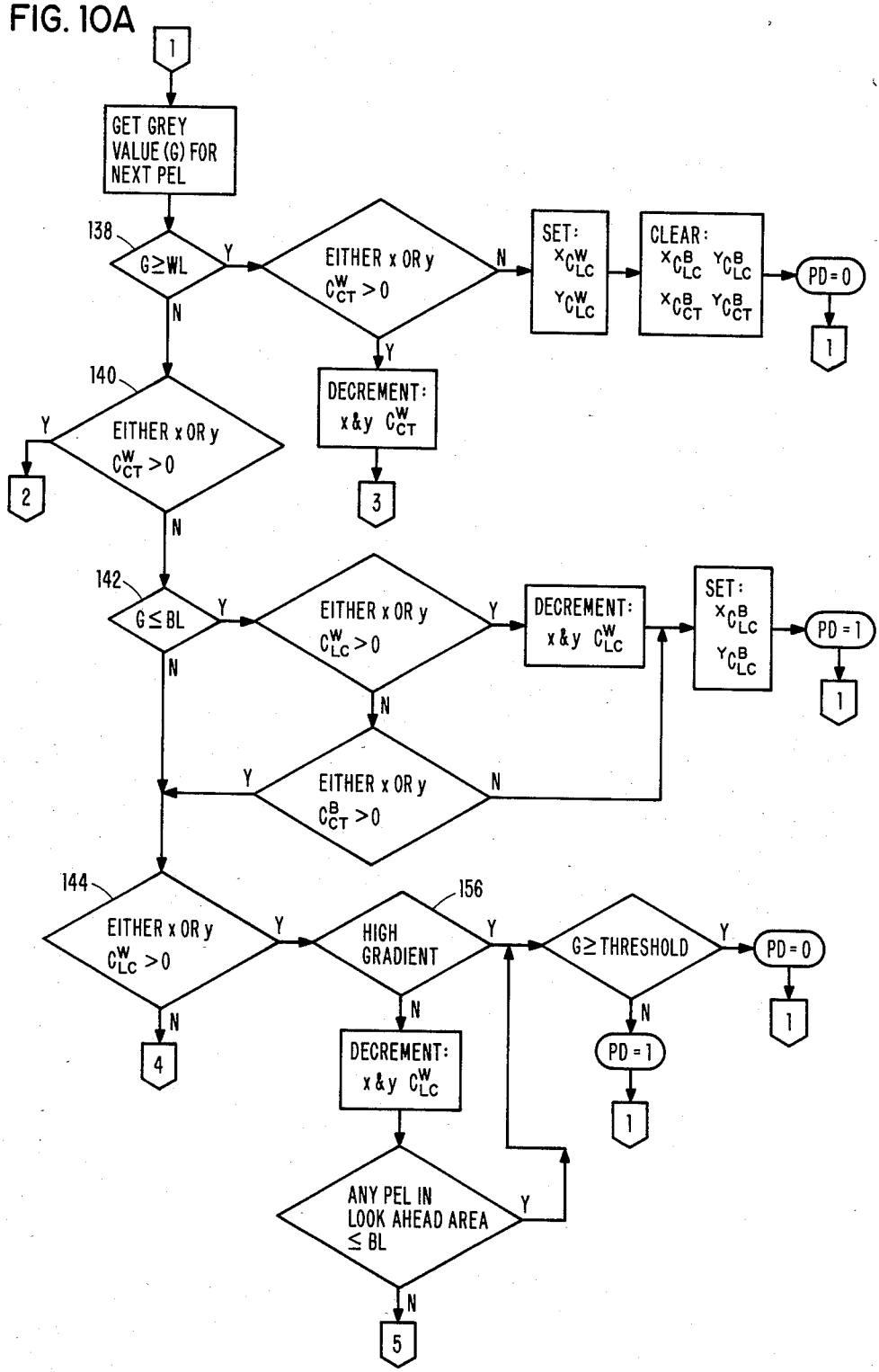
FIGS. 10A and B is a flowchart of the processing of a document in the embodiment of FIG. 1.
Figure 10B:
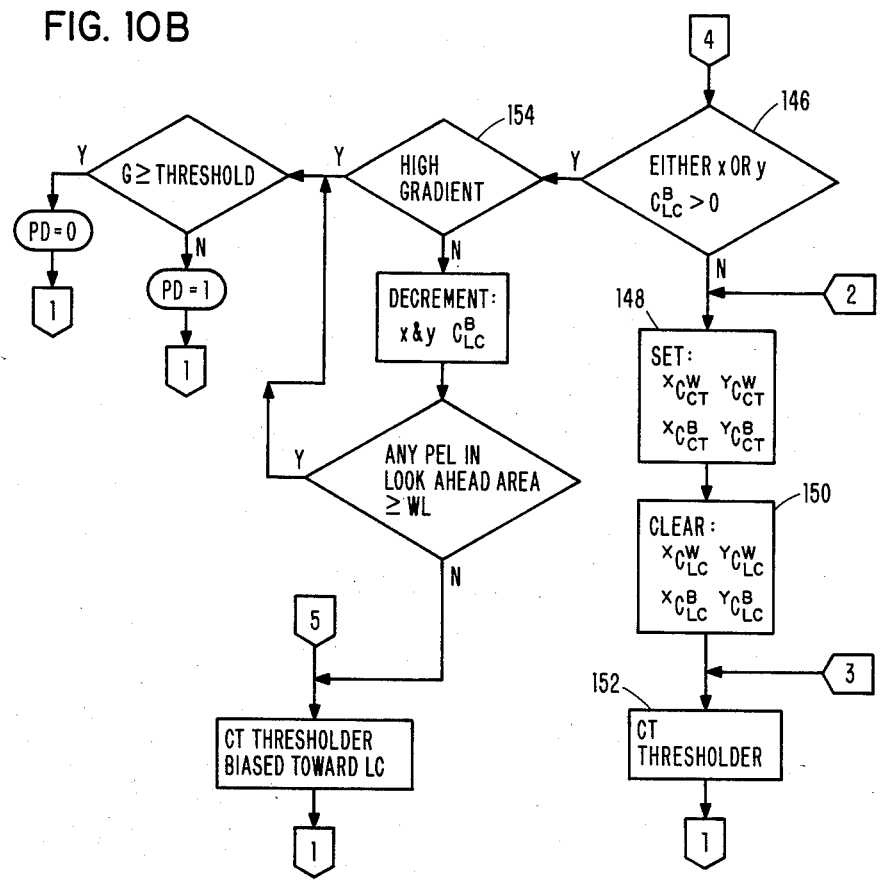

FIGS. 10A and 10B illustrate an alternate set of process steps which can be implemented within the system controller 30 to print documents having mixed formats. The flowchart in FIGS. 10 and 10B is more detailed than the flowchart in FIG. 9. Also, there is a continuous tone (CT) thresholder block which is biased towards line copy (LC). Also, the line copy threshold decision is generated from a plurality of points. Each of the points is identified by an elliptical symbol. The enter and exit blocks are identified by five-sided spike-like symbols. The diamond-shape boxes represent decisional blocks and the rectangular-shape boxes represent the functional blocks. The interconnecting lines show the functional path followed by the program. In operation, the program gets the gray scale value (G) for a PEL of interest. The PEL is tested in functional block 138 to determine whether it is greater than or equal to the white level (WL). If it is less than the white level, then the program enters decisional block 140. In decisional block 140, the program determines whether the X or Y white continuous tone counter, $^{x}C_{CT}^{w}$ or $^{y}C_{CT}^{w}$, is greater than 0. If it is not, the program that enters decisional block 142. In decisional block 142, the PEL is tested to determine whether it is less than or equal to the black level (BL). If it is not, the program then enters decisional block 144. There the program tests to see if either the X or Y white line copy counter is greater than 0. If it is not, the program enters decisional block 146 where it determines whether either the X or Y black line copy counter is greater than 0. If it is not, the program then enters functional block 148. In block 148, the program sets all four continuous tone counters. The program then enters functional block 150 where it clears all four line copy counters and then enters block 152 where the PEL is processed by the continuous tone thresholder. Since the other branches of the flowchart are self-explanatory from the figure and in view of the above description, they will not be described in detail. Suffice it to say that in decisional blocks 154 and 156 the program determines whether the gradient for the PEL of interest is greater than the gradient which was set in parameter latch 110 of FIG. 1.

In addition to the conditions which have been discussed previously which assure maintenance of quality print for continuous tone and line copy, a further protection on the continuous tone on the white end of the dynamic range and an increase in the percentage of cases covered on the black end can be achieved if the following procedures are followed:

(a) Instead of processing the data for an entire document left to right (see FIG. 4), the processing is alternated from left to right and from right to left on each succeeding line. The processing from the previous line is used to allow override of the line copy mode from the right as well as from the top and/or left for the black end of the dynamic range. For the white end of the dynamic range, a line of history counters is used to determine a region of continuous tone from above, connecting continuous tone on the left and right when a region above the white level separates the two. The line copy decision is overridden if continuous tone is present in both the previous PEL within the line and in the Y direction above. The alternate line processing prevents propagation into true background areas.

(b) The quality of print is further improved if each line is processed twice in the sequence; once from left to right and once from right to left, and the decisions are combined appropriately for maximum separation of continuous tone and line copy material. Finally, if the whole page is processed from top to bottom and from bottom to top and the decision process is appropriately combined, maximum protection of continuous tone and line copy will be provided from all four directions.

In operation, a document to be scanned is positioned upon the document glass of document scanner 10 (FIG. 1). The document may contain mixed formats or a single format. Initially, it is assumed that the machine is being used for the first time. Therefore, no prior information is stored in any of the counters. The system begins in a line copy mode and for the first set of PELs processed, the line copy thresholder is used for making the print/no-print decision. As the PELs are processed, the system controller 30 uses the process steps described in FIG. 9 or 10 to determine the characteristics of the data. If the test confirms that the system is processing line copy information, the line copy counters are set. The counters are set with a number characteristic of line copy information. These characteristics are described above. As more PELs are processed, whenever the system decides that a PEL is one of indecision (that is, neither white nor black), the counter is decremented. The process continues, that is, decrementing the counter and PELs of indecision, until the contents of the counter is zero. At this point, the system switches from the line copy thresholder to the continuous tone thresholder. In a similar manner, the continuous tone counters are set and decrement in a similar fashion. Thereby, a mixed format document is processed with an optimum thresholder to reproduce a quality document without intervention of an operator.

DEFOCUSED SYMMETRY AND INFORMATION HOMOGENEITY

So far, the above device processes documents containing line copy (text) material and continuous tone material (photographs). These are at least two other types of information which may be present in a general document. The first of these is "halftone" material. Halftone is a process whereby an originally continuous tone picture is reproduced by modulating a high frequency dot pattern. The second type of previously neglected information is referred to as "high frequency text." This means small, e.g., two point, text, complex text patterns, e.g., starburst patterns, or other high frequency text such as bar codes. In order to enable the above-described line copy/continuous tone device to process documents containing all or any of these several types of information, unique discriminators (to be described subsequently) are coupled to the line copy continuous tone device or the line copy continuous tone device is modified to become a true General Purpose Document Processing Device (GPD). As it is used in this application, a general purpose document processing device is an apparatus which accepts video data representative of documents containing halftones, continuous tones, normal, or high frequency textural material and automatically produces a data stream representing the optimum thresholding decisions for reproducing the original document on a bi-level printer.

Figure 12:
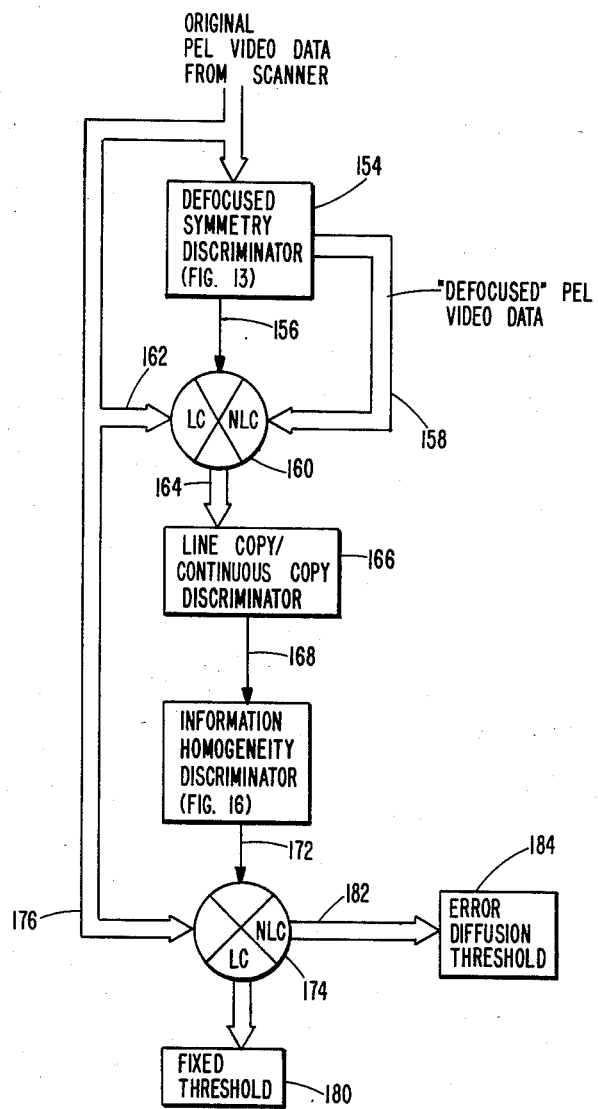
FIG. 12 is a block diagram of a general processing device (GPD) which processes documents containing line copy (LC), continuous tone (CT), halftone (HT), and small print text.

FIG. 12 shows a block diagram representation of one embodiment of a GPD according to the teaching of the present invention. The embodiment is referred to hereafter as the focus/defocus GPD. The focus/defocus GPD includes a defocused symmetry discriminator means 154. The function of the defocused symmetry discriminator means is to determine whether a PEL represents line copy information or nonline copy information. The output from the defocused symmetry discriminator means is coupled over simplex bus 156 and multiplexor bus 158 to a first switching means 160. The function of the first switching means 160 is to route either the original PEL video data (LC port) on multiplexor bus 162 or the defocused PEL video data (NLC port) on multiplexor bus 158 over multiplexor bus 164 to the line copy/continuous tone discriminator 166. The line copy/continuous tone discriminator 166 is described above. The details of the discriminator will not be repeated here. The discriminator accepts the video data on multiplexor bus 164 and determines whether the data represents line copy (LC) or nonline copy (NLC). It is the same as FIG. 10 minus the thresholding decision which is delayed until after switching means 174. The decision is transferred over simplex bus 168 to the information homogeneity discriminator means 170. The details of information homogeneity discriminator means will be given subsequently. The information homogeneity discriminator forms a map of all the decision supplied to it from the line copy/continous tone discriminator block. If the decision for a particular PEL is not the same as the decision for its neighbor or surrounding PELs, the characterization for that PEL is changed to match that of its surroundings. The decision from the information homogeneity discriminator means is fed over simplex bus 172 to switching means 174. The switching means routes the original PEL video data on multiplexor bus 176 in accordance with the decision on simplex bus 172. By way of example, if the PEL represents line copy, it is routed on multiplexor bus 178 to a conventional fixed thresholder 180. The fixed thresholder compares the video data against a fixed threshold level and outputs a control signal for driving a bilevel printer. If the PEL represents nonline copy data, it is routed over conductor 182 to a conventional error diffusion thresholder 184. The error diffusion thresholder processes the PEL and outputs control information for driving the bilevel printer. The *IBM Technical Disclosure Bulletin,* Vol. 23, No. 10, March 1981 (pgs. 4433-4435) in an article entitled "Multiple Error Correction Algorithm for Half Tone, Continuous Tone and Text Reproduction" describes a suitable error diffusion algorithm. Error Diffusion is a sophisticated thresholding technique which is capable of the highest quality reproduction of CT material and of HT material without the necessity of descreening the original. Because of its high resolution capability, it also reproduces LC with a minimum degree of degradation. It is an excellent choice for a general purpose thresholder because any error in discrimination of LC versus NLC is a soft failure. This article is incorporated herein by reference.

FIG. 13 shows a flowchart of the process steps or technique used in the defocused symmetry discriminator 154 (FIG. 12) to determine if a PEL represents line copy (LC) information or nonline copy (NLC) information.

The "defocused symmetry" technique takes advantage of the symmetry difference between the two information types. NLC information such as half-tones, when examined in a local region (on the order of the halftone cell, tends to be roughly symmetric. If this local region is intentionally defocused, the component halftone dots tend to blur into a uniform gray which is nondirectional and of low gradient. Often, the major remaining directionality component is a 45° halftone screen angle. On the other hand, line copy, particularly at the boundaries of characters, tends to have a specific directionality. Most character strokes are oriented either vertically or horizontally. This directionality is preserved even when defocused, particularly if the defocus is weighted in either the vertical or horizontal direction.

The defocus symmetry technique operates as follows. For each generated pixel or PEL, a pair of simulated defocused pixels are generated. The defocused pixels are horizontally and vertically weighted averages of the original pixel and their surrounding neighbors. A gradient is computed for each pixel in the two sets of simulated data. An overall gradient for each pixel is formed by taking the difference of the two gradients. If the overall gradient is greater than a predetermined threshold, the pixel is tentatively characterized as line copy. If not, the PEL is tentatively characterized as nonline copy. Because the decision of characterizing the PEL as LC or NLC is based solely on gradient, the thresholder used is referred to as a "simple thresholder."

Figure 13A:
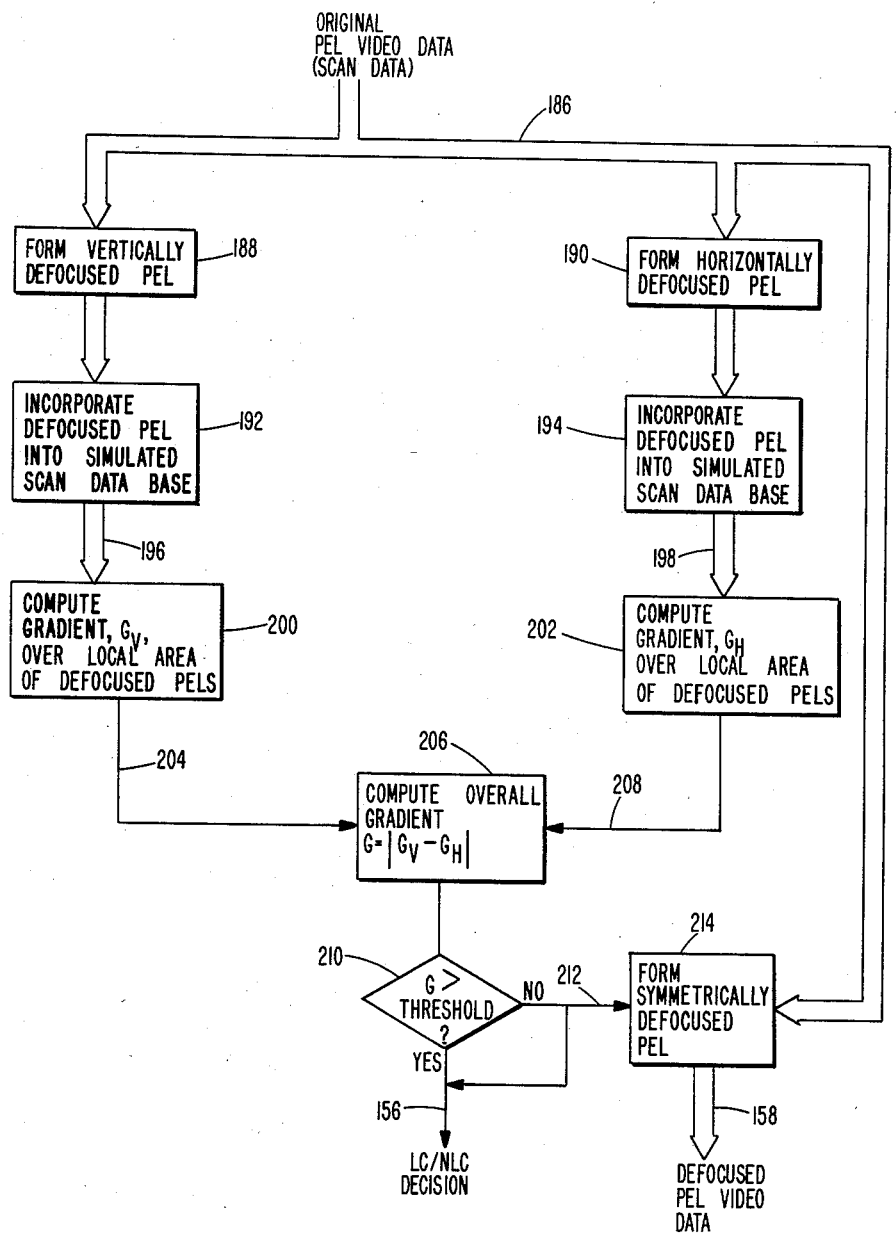

In FIG. 13A, the video values representative of the informational contents of a page are presented on multiplexor bus 186. It should be noted that the page is scanned left to right and top to bottom. Usually the PELs are processed in the same order in which the page is scanned. However, the PEL processing may alternate left to right and then right to left on successive or alternative lines. For each original PEL on multiplexor bus 186, two new sets of simulated PELs are formed. The simulated PELs are referred to as "defocused PELs." One set of defocused PELs is generated by the process step identified by block 188. The other set of defocused PELs is generated by the process step identified by numeral 190. The set of defocused PELs generated by block 188 is called the "vertical defocused PEL." Likewise, the defocused PELs generated by block 190 are called the "horizontal defocused PELs." Each of the defocused PELs, be it "vertical" or "horizontal", is formed from a weighted average of an original PEL of interest and its surrounding PELs.

In FIGS. 13B and 13C, the weighted averaging technique used to generate the defocused PELs are shown. FIG. 13B demonstrates the technique used to obtain the vertical defocused PEL while FIG. 13C shows the technique used to obtain the horizontal defocused PELs. Each PEL is represented by its video value in FIGS. 13B and 13C, respectively. The PEL of interest (that is, the center PEL surrounded by heavy lines in the FIGS.) is replaced by an average of the surrounding PEL values weighted by their respective weight as determined by PEL position in the matrix. Although the shape of the cells shown in FIGS. 13B and 13C are square, other types of cell shapes may be used to form the defocused cells. It is preferred that the cell shape be symmetrical. By way of example, FIGS. 14A, 14B and 14C show alternate cell shapes which can be used for the defocusing cells. Each of these cells takes advantage of the halftone screen symmetry. The diamond-type cell (FIG. 14A) requires fewer PELs, but the PELs must be weighted because the cell size does not coincide with PEL boundaries. The half cells (FIGS. 14B and 14C) are similar to FIGS. 13B and 13C but all PELs are equally weighted.

The cells in FIGS. 14B and 14C take advantage of the fact that the average gray value of each half of the halftone cell is equal to the average gray value of the entire halftone. This is true whether or not the half cell is oriented vertically or horizontally and independent of how the half cell is moved about horizontally or vertically. This is illustrated by FIG. 14D which shows a vertical half cell overlaying exactly one half of a repeat unit of a uniform halftone. Since half cells have either horizontal or vertical directionality, these tend to preserve the characteristics of horizontal and vertical character strokes, respectively, and to distinguish text characters from halftone.

The defocusing cell size is also of significance. If the defocusing cell size is not an integer multiple of the halftone cell size, phase effects can produce defocused cells which have an average density very different from that of the halftone cells. One technique for overcoming this is to generate a set of averages corresponding to a series of diminishing size cells and to use the cell size which gives the lowest gradient. This will be the averaging cell which is closest in size to the halftone cell.

In FIG. 13A, the defocus PELs (vertical and horizontal) are placed into the simulated scan data base (blocks 192 and 194, respectively). The process or procedure then proceeds along paths 196 and 198 to blocks 200 and 202, respectively. In blocks 200 and 202, a vertical gradient ($G_V$) and a horizontal gradient ($G_H$) are computed for each of the defocus PELs. In one embodiment of the present invention, the local area was defined by a 4×4 matrix. The local area may be defined by other types of matrixes without departing from the scope of the present invention. The gradient is computed as the maximum PEL value minus minimum PEL value in the defined area. It should be noted that gradient may be obtained by utilizing other methods. By way of example, the LaPlacian may be such a method. The vertical gradient is transmitted along path 204 into block 206 and the horizontal gradient ($G_H$) is transmitted along path 208 into block 206.

In block 206, an overall gradient (G) is generated. In one embodiment of the present invention, $G = G_V - G_H$. In another embodiment, $G = Max(G_V, G_H)$. FIG. 15 shows yet another approach for computing an overall gradient. Consider a PEL of interest bordered, on its corners, by four adjacent PELs, denoted 1, 2, 3 and 4 (shown "starred" in the figure). The average video value, $V_{(average)}$, for cells centered at 1, 2, 3 and 4 is determined. Next, the preliminary gradients, $G_1$ and $G_2$, is computed as shown.

$G_1 = V_{3(average)} - V_{1(average)}$, $G_2 = V_{4(average)} - V_{2(average)}$ Finally, the overall gradient, G, is simply:

$G = Max (G_1, G_2)$

This techniqud preserves characteristics for diagonal, horizontal and vertical characteristic strokes.

In FIG. 13, the next step in the procedure is that all overall gradient (G) is compared against a threshold value (block 210). If G is greater than the threshold value, the PEL is tentatively classified as line copy. If G is less than or equal to the threshold value, it is tentatively classified as nonline copy (NLC). The nonline copy decision leads along path 212 to block 214. Also, the original PEL on multiplexor bus 186 is applied to block 214. The function of block 214 is to defocus the PEL by one of the above means and pass this defocused video value to block 160 in FIG. 12. The defocused PEL video data is outputted on multiplexor bus 158. Processing of the PELs is continued in accordance with the above-described procedure.

Figure 16:
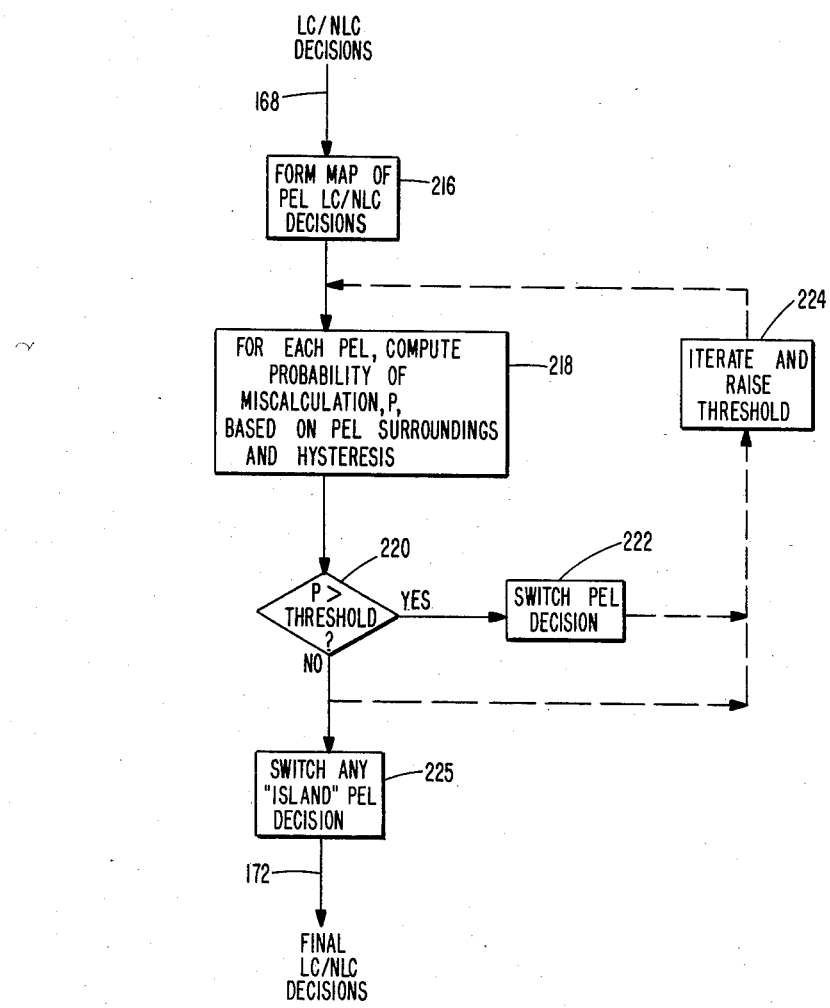
FIG. 16 is a flowchart showing the information homogeneity discriminator.

FIG. 16 shows a flowchart of the process steps performed by the information homogeneity discriminator 170 (FIG. 12). The first step (block 216) in the procedure is that a map representing the decisions on simplex bus 168 is formed. The program then continues to block 218. For each PEL, the history of the decisions for its previous PELs are used for the decisions made on the surrounding PELs. Based on this examination, a misclassification probability for each PEL is computed. If this probability is greater than some fixed threshold value (decision block 220), the PEL decision (block 222) is reclassified.

In one embodiment, line copy PELs are assigned a value of one and nonline copy PELs are assigned a value of zero. The decision history for previous PELs is examined in both the X and Y direction using hysteresis counters. Further, each PEL decision value is compared against the average decision value of its surrounding PELs.

In FIG. 16, after each PEL is examined and modified, the threshold for the misclassification probability is raised (block 224) and the process is repeated.

As a final check for misclassification PELs, the decision map is searched for any small "islands" of contrasting decision. If found, such "islands" are reclassified to the surrounding decision type (block 225). The final decision as to whether the PEL is line copy or nonline copy is fed over simplex bus 172 into switching means 174 (FIG. 13) and the original PEL video value is forwarded to the original thresholder. It should be noted that information homogeneity described above cannot be used alone, but when used with another discriminator, it provides a very significant increase in the quality of the overall discrimination. Thus, when both defocused symmetry and information homogeneity (IH) are used together, the percentage of correct discrimination decisions approaches 100 for most documents.

One additional IH technique worthwhile noting is the retroactive decision-making (RD) technique. Sometimes, because of the transition between background (white) and the halftone, the borders of the halftone will initially be classified as LC and the previously discussed IH techniques will not be successful enough. By storing the decisions for several lines, one can make a retroactive decision to change the borders to NLC based on subsequent processing. This will lead to a 100% successful discriminator.

In summary, the described procedure results in a highly accurate decision map for the document with each PEL classified as either LC or NLC.

HIGH FREQUENCY DETECTOR/DISCRIMINATOR

Figure 17:
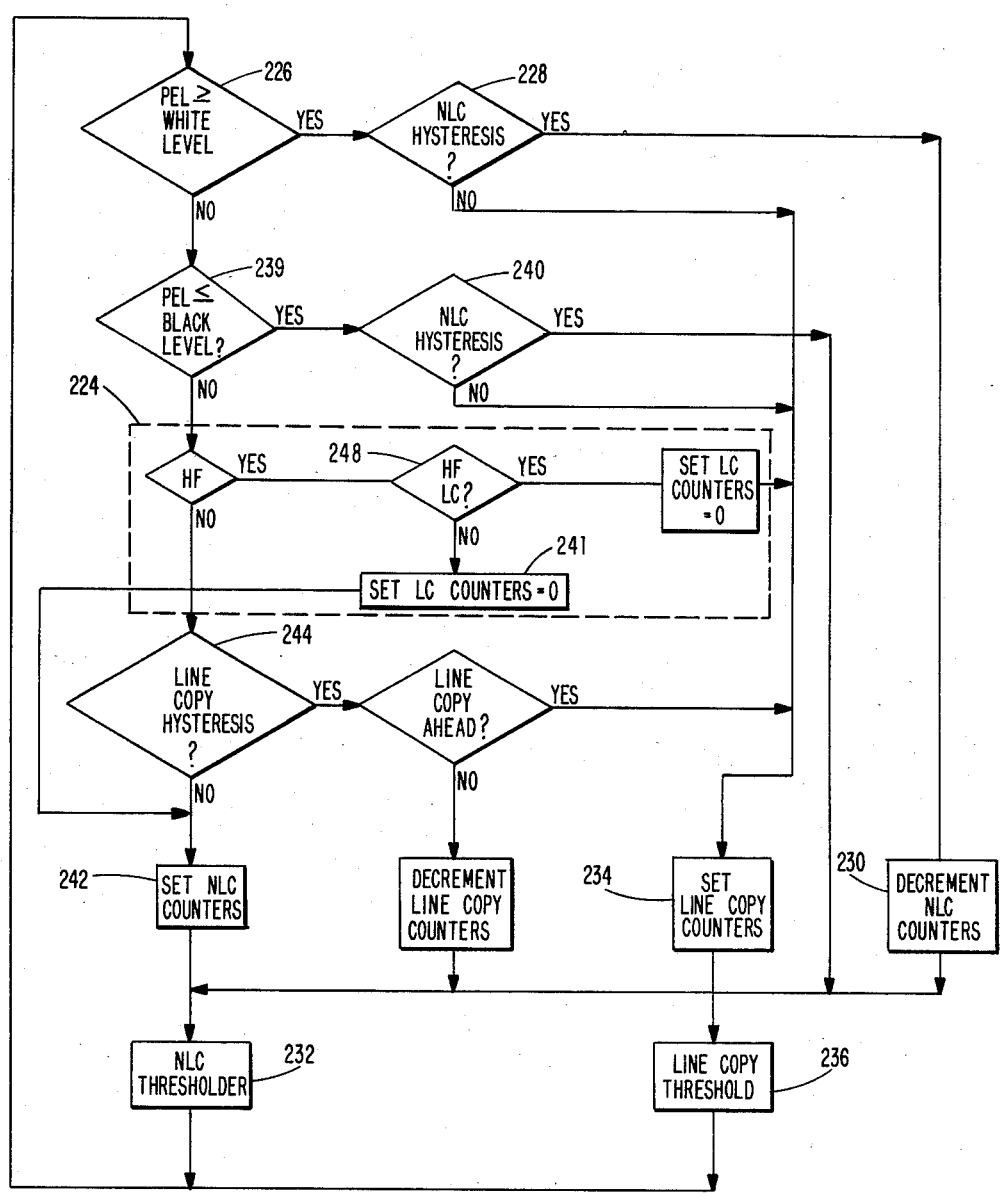
FIG. 17 is a flowchart of an alternative GPD process.

FIG. 17 shows an alternate embodiment of a general purpose text processing device (GPD) according to the teaching of the present invention. This GPD uses a high frequency detector/discriminator to identify high frequency line copy (LC) and high frequency detector/discriminator section of this GPD is shown in the enclosure identified by numeral 224 in FIG. 17 and in more detail in FIGS. 18 and 19.

In FIG. 17, the video PELs which represent the informational contents of a scanned page are processed in seriatim by block 226. In block 226, the PEL is tested to determine whether it is greater than the white level. As described above, a fixed thresholder is used for testing the PEL. If the PEL is greater than the white level, it is then processed by block 228. In block 228, the program determines whether there is nonline copy (NLC) hysteresis. This test is done by checking to determine whether there is any information in the hysteresis counter. If there is nonline copy hysteresis, the nonline copy hysteresis counter is decremented (block 230) and the PEL is forwarded for thresholding in the nonline copy thresholder (block 232). If the test in block 228 shows that there is no nonline copy hysteresis, the program sets the line copy counters (block 234) and the PEL is thresholded against a line copy thresholder (block 236). If the PEL (block 226) is less than the white level, it is processed by block 238. In block 238, the PEL is tested to determine whether it is less than or equal to the black level. If it is, the program determines whether there is nonline copy (NLC) hysteresis (block 240). If there is nonline copy hysteresis, the PEL is then thresholded by the nonline copy thresholder (block 232). If there is no nonline copy hysteresis, then the program sets the line copy counters (block 234) and the PEL is thresholded against the line copy thresholder 236. In the event that the PEL is greater than the black level, it is processed by the high frequency detector 224. Details of this high frequency detector will be described subsequently. If the PEL is a high frequency (HF) line copy (LC) datum, the program sets the line copy counter equal to zero (block 241) and sets the nonline copy counters (block 242). If the PEL is not high frequency line copy and there is no line copy hysteresis (block 244), the program sets the nonline copy counters and the nonline copy thresholder 232 is used. If there is line copy hysteresis (block 244) and there is no line copy ahead, the line copy counter is decremented and the nonline copy thresholder 232 is used. In essence, the GPD of FIG. 17 makes a determination as to whether the PEL is black or white. If the PEL is neither black nor white, the PEL is tested in the context of the surrounding information for high frequency contents. It should be noted that although a special high frequency tester will be described hereinafter, any high frequency detection technique known in the art may be used. By way of example, such frequency detection techniques may be autocorrelation or Fourier analysis. If high frequency contents are found, it is further classified as either line copy (LC) (for small point test) or halftone (that is nonline copy). Based on this classification, the appropriate counters are set to zero and reset to maximum when the appropriate thresholders are applied. It should be noted that the appropriate counters are those previously described in accordance with FIG. 1 and will not be redescribed here. It should also be noted that the counter which is designated for use as the continuous counter in FIG. 1 is now used as the hysteresis counter for nonline copy data (that is, continuous tone and halftone).

Figure 18:
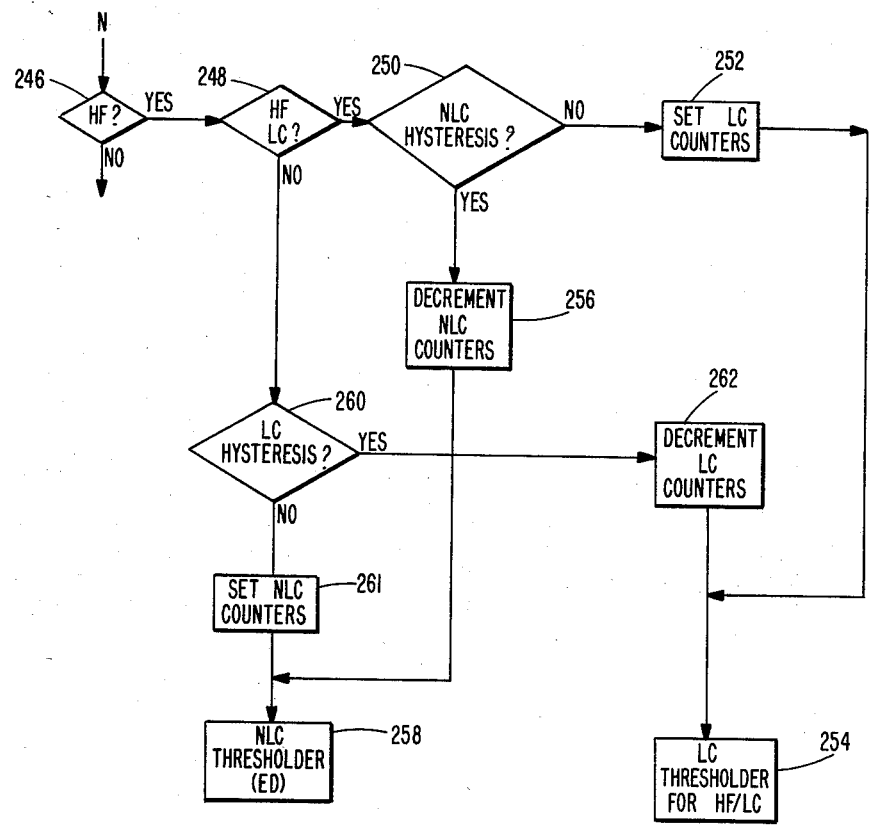
FIG. 18 is an expanded flowchart of the process steps within the boxed-in section 224 of FIG. 17.

In FIG. 18, a more detailed flowchart of the technique used to classify a high frequency video PEL is shown. If the PEL is neither white nor black, it is processed by high frequency block 246. The details of high frequency block 246 will be described subsequently. If the block decides that the PEL is not high frequency, the program continues at block 244 (FIG. 17). If the PEL represents high frequency data, it continues at block 248. The program determines whether the PEL represents high frequency line copy information (HF/LC). As described above, high frequency line copy information represents small point text. If the PEL is high frequency line copy information, the program determines whether there is nonline copy hysteresis (block 250). If there is no nonline copy hysteresis, the program sets the line copy counters (block 252) and the PEL is processed by the line copy thresholder for high frequency line copy (HF/LC block 254). If there is nonline copy hysteresis, then the program decrements the nonline copy counters (block 256) and the PEL is thresholded against the nonline copy thresholder (block 258). In the preferred embodiment of this invention, block 258 represents an error diffusion type thresholder (ED). This thresholder was previously described so details will not be given. If the high frequency bit is not a high frequency line copy (block 248), the program determines whether there is line copy hysteresis (block 260). If there is, the line copy counters are decremented (block 262) and the PEL is thresholded with a line copy thresholder for high frequency line copy information. If there is no line copy hysteresis (block 260), the program sets a nonline copy counter (block 261) and the PEL is thresholded with an error diffusion thresholder.

Figure 19:
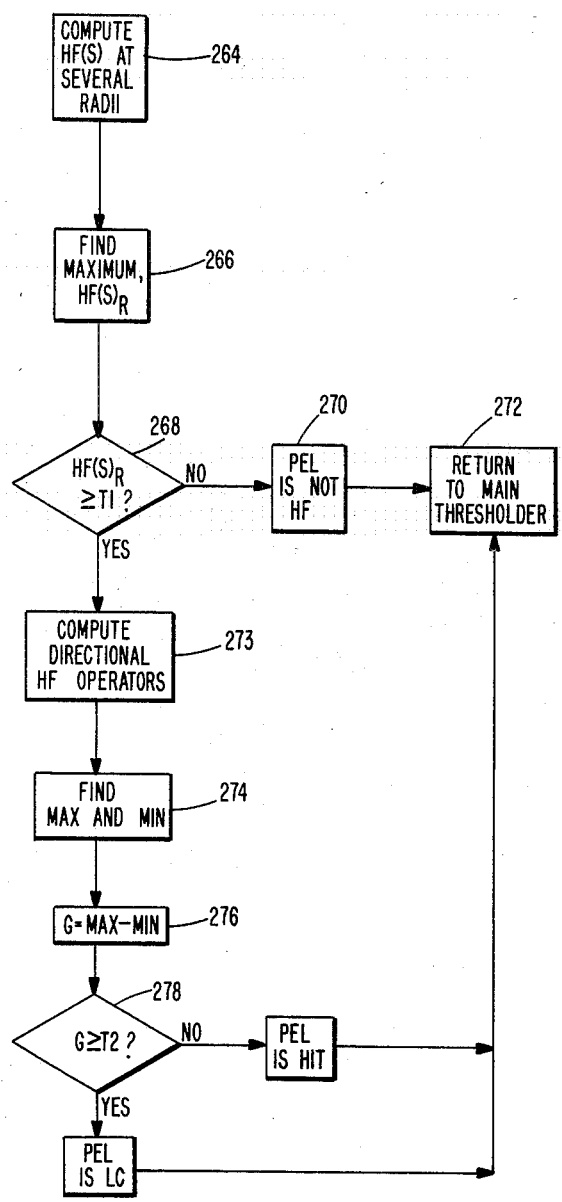
FIG. 19 is a flowchart of the process steps used to determine if a PEL is a high frequency line copy, i.e., small text, or high frequency halftone, showing the details of the HF and the HF-LC decision modules in FIGS. 17 and 18.

In FIG. 19, there is shown a flowchart of the procedure which is followed in high frequency block 246 (FIG. 18). In essence, the block decides if the PEL is a high frequency PEL. If the PEL is a high frequency PEL, the block or module decides if it is line copy (that is small text), or if the PEL is a high frequency halftone. For each PEL, an optimum high frequency operator ($HF_R$) is applied. If $HF_R$ is greater than a predetermined thresholder T1, the PEL is classified as a high frequency PEL. For each high frequency PEL, four directional high frequency operators are generated. The maximum and minimum values for the four operators are determined. A high frequency gradient, G = maximum − minimum, is computed for each high frequency PEL. G is then compared against a second predetermined threshold level $T_2$. If G is greater than $T_2$, then the PEL is characterized as a line copy. If the gradient G is less than $T_2$, then the PEL is characterized as halftone (HT).

Figure 20A:
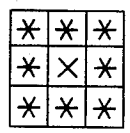
FIGS. 20A–20C are a graphical representations of the high frequency operator HF(S).
Figure 20B:
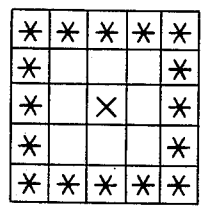
Figure 20C:
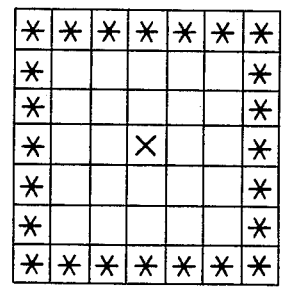
Figure 21A:
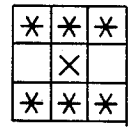
FIGS. 21A–21D are show a graphical representations of directional high frequency operators.
Figure 21B:
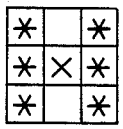
Figure 21C:
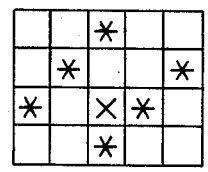
Figure 21D:
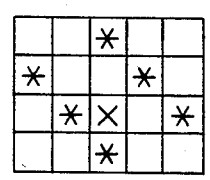

As described above, a common type of high frequency text information is very small or very thin lettering or graphics, e.g., two point type or bar codes. This size may be considered high frequency information for a system with a scanning resolution of less than 500 pixels per inch. The line copy type information requires a thresholder adopted to line copy and designed to enhance its black-white-black transition. A problem lies in that this high frequency line copy information appears to the system as almost identical to a high frequency pattern of many halftone line screens. The small black dots on a white background which make up the halftone screen (or halftone character) pattern have a sufficient frequency overlapped with, for example, two point and four point text. For optimum reproduction, one wants to threshold the line copy so as to enhance the black-white contours. On the other hand, the desired thresholding technique for halftone is to minimize or to eliminate the black-white transition and to reproduce only the gray continuous tone information contained therein. To effectuate such as desirable result, the flowchart in FIG. 19 describes a series of process steps or techniques. The first step in the technique is to generate a symmetrical high frequency operator HFS at several different radii (block 264). In FIGS. 20A–20C, the operator is the absolute value of the difference between the average gray scale value of the starred pixels and the gray scale value of the center pixel (marked with an X) which is the PEL of interest. Stated another way, $$HF(S) = [\text{Avg}(*'d \text{ PELs})] - [\text{Center PEL}]$$

For each PEL, the high frequency operator HF(S) is generated at different radii. By way of example, in FIG. 20A the radius is 1; in FIG. 20B, the rdius is 2; and in FIG. 20C, the radius is 3. The radius which produces a maximum value for the operator becomes the radius of interest (R) and is the radius used in all subsequent operations. It should be noted that the selected radius R is a measure of the frequency of the high frequency information.

In FIG. 19, for each PEL, the maximum operator for that radius is generated (block 266). The value of HF(S) at radius R is compared against the thresholder T1 (block 268). If $HF(S)_R$ is greater than or equal to the threshold T1, the PEL is not high frequency information (block 270) and the program returns to the main thresholder for ordinary processing of line copy and continuous tone information (block 272). However, if $HF(S)_R$ is greater than or equal to T1, the program determines directionality, high frequency (HF) operators (block 273). As will be explained subsequently, the high frequency operators are used to identify whether the PEL represents small point text (line copy) or halftone information. It should be noted that the threshold value for T1 is determined from a statistical examination of many different documents.

In FIGS. 21A-21D, there is shown a schematic of four-directional high frequency operators for a radius R equal to 1. The operators are:
(i) an X directional operator, HF(X)
(ii) a Y directional operator, HF(Y)
(iii) two diagonal operators, HF(D1), HF(D2)

A PEL which has been identified as a high frequency PEL from the above-described procedure is now tested with each of these operators applied at the radius R. One of the four operators will produce a maximum value (MAX) and another will produce a minimum value (MIN).

In FIG. 19, the maximum and minimum gradient is generated (block 274). A high frequency gradient $G=(MAX-MIN)$ is computed for each high frequency PEL (block 276). G is then compared against a second threshold level T2 (block 278). If G is less than T2, then the high frequency information is not directional in character and the PEL is characterized as halftone. If G is greater than or equal to T2, then the high frequency information is directional in nature and the PEL is classified as line copy. The above-described high frequency detector/discriminator can be used more effectively by coupling it to the information homogeneity device described previously. The coupling is done in a similar manner as described for the Defocused Symmetry Discriminator.

The above apparatus describes a fully automatic digital image processing device for use with binary document printers. The document to be reproduced is placed on the document glass of a scanner and the video information is processed according to the teaching of the present invention to reproduce copies of the original. The documents may contain mixed format information such as line copy, continuous tone, halftone and small text information. The reproduction is completely automatic without the intervention of an operator.

Although the invention has been particularly shown and described with reference to a preferred embodiment thereof, it will be understood by those skilled in the art that various changes in form and details may be made therein without departing from the spirit and scope of the invention.

What is claimed is:

1. A thresholding mode-switching device for automatically selecting an optimum operational mode for printing copies of documents having a mixed format, said mode-switching device comprising:
   scanning means for generating a stream of pixel values representative of reflectance characteristics of a scanned document;
   input buffer means for storing a predetermined number of pixel values;
   look-ahead logic means coupled to said buffer means for supplying look-ahead signals based on values of pixels subsequent to said pixel of interest;
   hysteresis means coupled to said buffer means for supplying hysteresis signals based on values of pixels preceding said pixel of interest; and
   controller means responsive to said look-ahead signals, said hysteresis signals, and the stored value of said pixel of interest for selecting an optimum operational mode.

2. The thresholding mode-switching device of claim 1 further including a thresholding means coupled to the controller for thresholding continuous tone images.

3. The thresholding mode-switching device of claim 1 wherein the hysteresis means includes:
   a first plurality of counter means for storing a first plurality of counts representative of hysteresis in the X-direction;
   a second plurality of counter means for storing a second plurality of counts representative of hysteresis in the Y-direction; and
   a plurality of serial memory means coupled to the second plurality of counter means for cycling said second plurality of counts.

4. A thresholding mode-switching device as claimed in claim 1 further including:
   gradient means coupled to the buffer means for generating gradient signals representative of a gradient associated with the values of pixels surrounding a pixel of interest and wherein said controller is also responsive to said gradient signals.

5. The thresholding mode-switching device of claim 4 further including a thresholding means coupled to the controller and for thresholding continuous tone images.

6. The thresholding mode-switching device of claim 4 wherein the hysteresis means includes:
   a first plurality of counter means for storing a first plurality of counts representative of hysteresis in the X direction;
   a second plurality of counter means for storing a second plurality of counts representative of hysteresis in the Y direction; and
   a plurality of serial memory means coupled to the second plurality of counter means for cycling said second plurality of counts.

7. Method for processing and printing a mixed format document, said method comprising the following steps:
   (a) generating a stream of digital signals indicative of PELs representing the informational contents of said document;
   (b) selecting one of a plurality of thresholders for processing the digital signals;
   (c) setting a predetermined count within a counting means;
   (d) using the thresholder of step (b) for generating "print/no-print" decision for the data of step (a);
   (e) decrementing the predetermined count on a PEL of indecision;
   (f) repeating steps (d)-(e) until the count is zero; and
   (g) switching from the present thresholder to another one of the plurality of thresholders.

8. The method recited in claim 7 wherein the selecting step comprises:
   (a) generating a "white" level;
   (b) generating a "black" level;
   (c) fetching a PEL of interest;
   (d) comparing the PEL against said "white" level;
   (e) comparing the PEL against said "black" level; and
   (f) selecting a line copy or continuous tone thresholder depending on the contents of hysteresis counters, gradient comparison and look-ahead comparison.

9. Apparatus for reproducing an original represented by a serial stream of digital data, each item of data having a PEL value corresponding to the value of a surface characteristic (e.g. reflectance) of the elemental area (PEL) of the original represented by the item of data, said apparatus being capable of operating in more than one mode to produce copies of different or mixed nature (e.g. continuous tone, line or printed) originals and comprising:
   buffer means for receiving and buffering the serial stream of data;

means for comparing the value of each item of data with first and second threshold values and operable to generate contrast signals indicative of whether the PEL value is greater than the first threshold value, between the threshold values, or below the second threshold value;

first means effective in operation to cause the apparatus to operate in a first mode according to a first algorithm;

second means effective in operation to cause the apparatus to operate in a second mode according to a second algorithm; and selection means connected to receive the contrast signals and operative selectively to render the first or second means operative, said apparatus being characterized by further comprising look-ahead means connected to receive the PEL values successively stored in a first group of buffer positions and operative to generate a succession of selection signals indicative of whether any PEL value in each group lies in the band of values between the first and second threshold values or outside that band, each selection signal being associated with the PEL value occupying a particular location in the first group, being supplied to the selection means and being used by the selection means in selecting the operational mode of the apparatus.

10. Apparatus as claimed in claim 9 further characterized by comprising hysteresis means operable to generate and store hysteresis signals representative of preceding operational mode and/or preceding PEL values.

11. Apparatus as claimed in claim 10 further characterized in that the hysteresis means comprises a first x-counter and a first y-counter associated with a first mode of operation of the apparatus, a first predetermined value being set in the counters in response to detection by the apparatus of a first predetermined data sequence in the incoming stream of data and the values in the first counters being decremented in response to detection of a subsequent second predetermined data sequence in the incoming stream of data.

12. Apparatus as claimed in claim 11 further characterized in that the hysteresis means further comprises a second x-counter and a second y-counter associated with a second mode of operation of the apparatus, a second predetermined value being set in the second counters in response to detection by the apparatus of a third predetermined data sequence in the incoming stream of data and the values in the second counters being decremented in response to detections of a subsequent fourth predetermined data sequence in the incoming data sequence.

13. Apparatus as claimed in claims 11 or 12, in which the stream of incoming data is generated by scanning the original in the y-direction, further characterized in that each y-counter has an associated serial storage shift register having a number of stages equal to the number of PELs in the y-scan direction of the original.

14. Apparatus as claimed in claim 9 further characterized by comprising gradient means connected to receive the PEL values stored in a second group of buffer positions and operative to generate for each second group a gradient signal, the gradient signal being associated with the particular PEL value occupying a predetermined buffer location in the second group and having a value dependent on the rate of change of the surface characteristic in a region of the original contiguous to the PEL corresponding to the particular PEL value; and means for comparing the value of each generated gradient signal with a predetermined datum gradient value and operable to generate transition signals indicative of whether the value of each generated gradient signal is greater or smaller than the datum gradient value, said transition signals being supplied to the selection means and being used by the selection means in selecting the operational mode of the apparatus.

15. Apparatus for reproducing an original represented by a serial stream of digital data, each item of data having a PEL value corresponding to the value of a surface characteristic (e.g. reflectance) of the elemental area (PEL) of the original represented by the item of data, said apparatus being capable of operating in more than one mode to produce copies of different or mixed nature (e.g. halftone, line or printed) originals and comprising:

buffer means for receiving and buffering the serial stream of data;

means for comparing the value of each item of data with first and second threshold values and operable to generate contrast signals indicative of whether the item value is greater than the first threshold value, between the threshold levels or below the second threshold value;

gradient means connected to receive the PEL values stored in a first group of buffer positions and operable to generate for each first group a gradient value signal which is associated with the PEL value occupying a particular location in the first group;

means for comparing the generated gradient values with a predetermined datum gradient value and operable to generate transition signals indicative of whether the generated gradient value is greater or less than the predetermined datum gradient value; and controller means, connected to receive the stream of digital data together with the transition signals, for selecting the operational mode of the apparatus, said apparatus being characterized by further comprising look-ahead means connected to receive the PEL values stored in a second group of buffer positions and operable to generate a selection signal for each group indicative of whether any PEL value in the group lies in the band of values between the first and second threshold values or outside that band, each selection signal being associated with the PEL value occupying a particular location in the second group, being supplied to the controller means, and being used by the controller means in selecting the operational mode of the apparatus.

16. Method for reproducing mixed format documents comprising the following steps:

generating a stream of PEL video data representative of the informational contents of the mixed format document;

utilizing a first discriminator to determine if the PEL represents line copy or nonline copy and to generate a stream of simulated PELs;

utilizing a second discriminator to process either the PEL video data or the stream of simulated PELs and to generate a stream of decision classifying the process PELs as line copy or nonline copy;

utilizing a third discriminator to examine the stream of decisions to reclassify the decision of any PEL which is different from surrounding PELs and to generate an adjusted stream of decision classifying the process PELs as line copy or nonline copy;

thresholding the stream of PEL video data against a first thresholder for PELs identified as line copy by the adjusted stream of decision; and thresholding the stream of PEL video data against a second thresholder for PELs identified as nonline copy by the adjusted stream of decision.

17. The method of claim 16 further including the following step, using the values outputted from the thresholder to drive a bilevel printer so that a copy of the mixed format document is reproduced.

18. The method of claim 16 wherein the first discriminator is a defocus symmetry technique.

19. The method of claim 18 wherein the defocus/symmetry technique includes the following steps:
generating a first stream of simulated pixels with each simulated pixel being formed from a horizontal weighted average of an original pixel of interest and its surrounding neighbors;
generating a second data stream of simulated pixels with each simulated pixel being formed from a vertical weighted average of the original pixel of interest and its surrounding neighbors;
computing a gradient ($G_H$) for the simulated pixel of the first data stream;
computing a gradient ($G_V$) for the simulated pixels of the second data stream;
computing an overall gradient $(G) = (G_V - G_H)$;
comparing the overall gradient G with a predetermined threshold level;
characterizing the original PEL as line copy for G having a value more than the predetermined threshold level; and
characterizing the original PEL as nonline copy for G having a value less than the predetermined threshold level.

20. The method of claim 16 wherein the third discriminator is an information homogeneity technique.

21. The method of claim 20 wherein the information homogeneity technique includes the following steps:
(a) generating line copy (LC)/nonline copy (NLC) decisions for the original PELs of interest;
(b) generating a map for the decisions;
(c) calculating a misclassification probability P for the PEL, with the misclassification probability being based on PEL surroundings and hysteresis;
(d) generating a predetermined threshold level;
(e) comparing the probability P with the threshold level; and
(f) reclassifying the decision for PELs whose probability P are less than the threshold.

22. The method of claim 21 further including the steps of switching the decision for PELs having a probability (P) greater than the threshold;
raising the threshold level; and
repeating steps (c) through (f).

23. The method of claim 16 wherein the second discriminator is a line copy/nonline copy continuous tone technique.

24. The method of claim 16 wherein an error diffusion technique is the second thresholder.

25. Apparatus for reproducing mixed format documents comprising:
means for including an optical scanner for generating a stream of PEL video data representative of the informational contents of the mixed format document;
a first discriminator means coupled to the scanner, said first discriminator means being operable for determining the characteristic of the PEL and for generating a stream of simulated PELs;
a second discriminator means coupled to the first discriminator means, said second discriminator means being operable for processing either the PEL video data or the stream of simulated PELs and to generate a stream of decisions classifying the processed PELs as line copy or nonline copy;
a third discriminator means coupled to the second discriminator means, said third discriminator means being operable to examine the stream of decisions to reclassify the decision of any PEL which is different from surrounding PELs and to generate an adjusted stream of decision classifying the process PELs as line copy or nonline copy;
means coupled to the third discriminator, said means being operable for thresholding line copy PELs; and
means coupled to the third discriminator, said means being operable for thresholding nonline copy PELs.

26. A method for classifying mixed format documents into line copy (LC) and nonline copy, said method having the following steps:
generating a stream of original pixels representative of the informational contents of the documents;
generating a first stream of simulated pixels with each simulated pixel being formed from a horizontal weighted average for an original pixel of interest and its surrounding neighbors;
generating a second data stream of simulated pixels with each simulated pixel being formed from a vertical weighted average for the original pixel of interest and its surrounding neighbors;
computing a gradient ($G_H$) for the simulated pixel of the first data stream;
computing a gradient ($G_V$) for the simulated pixels of the second data stream;
computing an overall gradient $(G) = G_V - G_H$;
comparing the overall gradient G with a predetermined threshold level;
characterizing the original PEL as line copy for G less than the predetermined threshold level; and
characterizing the original PEL as nonline copy for G greater than the predetermined threshold level.

27. In a document reproduction device wherein a document is being scanned, thresholded and reproduced, an improved thresholder for processing and printing documents having a continuous tone format or a text format comprising:
means for buffering a stream of video pixels representative of the information contents for the document;
means responsive to said buffering means for generating gradient signals using pixels surrounding a pixel of interest;
means responsive to said buffering means for generating a look-ahead signal representative of reflectance characteristic of pixels following the pixel of interest;
means responsive to said buffering means for storing level information signals representative of reflectance characteristics of a document to be reproduced; and
control means for correlating the gradient signals, the look-ahead signals, and said level information signals to select an optimum thresholder for processing text or continuous tone.

* * * * *